US008805839B2

(12) United States Patent
Fitzgerald et al.

(10) Patent No.: US 8,805,839 B2
(45) Date of Patent: Aug. 12, 2014

(54) ANALYSIS OF COMPUTER NETWORK ACTIVITY BY SUCCESSIVELY REMOVING ACCEPTED TYPES OF ACCESS EVENTS

(75) Inventors: Robert E. Fitzgerald, Bellevue, WA (US); Jack W. Stokes, North Bend, WA (US); Alice X. Zheng, Seattle, WA (US); Edward W. Hardy, Seattle, WA (US); Bodicherla Aditya Prakash, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 133 days.

(21) Appl. No.: 12/755,438

(22) Filed: Apr. 7, 2010

(65) Prior Publication Data

US 2011/0252032 A1    Oct. 13, 2011

(51) Int. Cl.
*G06F 7/00* (2006.01)
*G06F 17/30* (2006.01)

(52) U.S. Cl.
USPC .......................................................... 707/737

(58) Field of Classification Search
CPC .................................................. G06F 17/3071
USPC .......................................... 707/E17.032, 737
See application file for complete search history.

(56) References Cited

U.S. PATENT DOCUMENTS

| | | | |
|---|---|---|---|
| 7,162,741 B2 | 1/2007 | Eskin et al. | |
| 7,181,768 B1 | 2/2007 | Ghosh et al. | |
| 7,624,448 B2 | 11/2009 | Coffman | |
| 7,680,672 B2 * | 3/2010 | Olsson et al. | 705/301 |
| 8,001,594 B2 * | 8/2011 | Heintz et al. | 726/22 |
| 8,321,261 B2 * | 11/2012 | Gross | 705/7.32 |
| 2002/0113785 A1 * | 8/2002 | Hill | 345/420 |
| 2004/0039968 A1 | 2/2004 | Hatonen et al. | |
| 2004/0098617 A1 | 5/2004 | Sekar | |
| 2004/0193870 A1 * | 9/2004 | Redlich et al. | 713/154 |
| 2005/0138026 A1 * | 6/2005 | Liu et al. | 707/5 |
| 2005/0160340 A1 | 7/2005 | Abe et al. | |
| 2005/0212818 A1 * | 9/2005 | Hudson, Jr. | 345/619 |
| 2006/0034305 A1 | 2/2006 | Heimerdinger et al. | |
| 2006/0037077 A1 | 2/2006 | Gadde et al. | |
| 2006/0095968 A1 | 5/2006 | Portolani et al. | |
| 2006/0149848 A1 * | 7/2006 | Shay | 709/229 |

(Continued)

OTHER PUBLICATIONS

Fenkam et.al., "Towards an Access Control System for Mobile Peer-to-Peer Collaborative Environments"., 1080-1383/02 $17.00 © 2002 IEEE.*

(Continued)

*Primary Examiner* — Tony Mahmoudi
*Assistant Examiner* — Muluemebet Gurmu
(74) *Attorney, Agent, or Firm* — Stephen Wight; Carole Boelitz; Micky Minhas

(57) ABSTRACT

An analysis system is described for identifying potentially malicious activity within a computer network. It performs this task by interacting with a user to successively remove known instances of non-malicious activity, to eventually reveal potentially malicious activity. The analysis system interacts with the user by inviting the user to apply labels to identified examples of network behavior; upon response by the user, the analysis system supplies new examples of network behavior to the user. In one implementation, the analysis system generates such examples using a combination of feature-based analysis and graph-based analysis. The graph-based analysis relies on analysis of graph structure associated with access events, such as by identifying entropy scores for respective portions of the graph structure.

20 Claims, 16 Drawing Sheets

(56) References Cited

U.S. PATENT DOCUMENTS

| | | | |
|---|---|---|---|
| 2006/0191010 A1 | 8/2006 | Benjamin | |
| 2007/0005341 A1* | 1/2007 | Burges et al. | 704/9 |
| 2007/0074272 A1 | 3/2007 | Watanabe | |
| 2008/0208857 A1* | 8/2008 | Liu et al. | 707/6 |
| 2008/0282324 A1 | 11/2008 | Hoal | |
| 2009/0099988 A1 | 4/2009 | Stokes et al. | |
| 2009/0172815 A1* | 7/2009 | Gu et al. | 726/23 |
| 2009/0265242 A1 | 10/2009 | Horvitz et al. | |
| 2009/0276855 A1* | 11/2009 | Anderson et al. | 726/26 |

OTHER PUBLICATIONS

Gibson, et al., "Discovering Large Dense Subgraphs in Massive," retrieved at <<http://reference.kfupm.edu.sa/content/d/i/discovering_large_dense_subgraphs_in_mas_3487998.pdf>>, Proceedings of the 31st International Conference on Very Large Data Bases, 2005, pp. 721-732.

Jacob, et al., "Behavioral Detection of Malware: From a Survey Towards an Established Taxonomy," retrieved at <<https://agora.cs.illinois.edu/download/attachments/19924902/Jacob08.pdf>>, Journal in Computer Virology, Feb. 21, 2008, pp. 251-266.

Kolbitsch, et al., "Effective and Efficient Malware Detection at the End Host," retrieved at <<http://www.iseclab.org/papers/usenix_sec09_slicing.pdf>>, Conference Proceedings of the 18th USENIX Security Symposium, Aug. 2009, pp. 1-16.

Gupta, et al., "An Empirical Study of Malware Evolution," retrieved at <<http://pages.cs.wisc.edu/~akella/papers/malware-comsnets.pdf>>, Proceedings of the First International Conference on Communication Systems and Networks, Jan. 2009, 10 pages.

Lewis, et al., "Pervasive Secure Infrastructures (PSI): Integrating Smart Sensing, Data Mining, Pervasive Networking and Community Computing—ITR Project Report," retrieved at <<http://crewman.uta.edu/psi/download/psi_report.pdf>>, 2008, 5 pages.

Eskin, et al., "A Geometric Framework for Unsupervised Anomaly Detection: Detecting Intrusions in Unlabeled Data," retrieved at <<http://www.cs.cmu.edu/~aarnold/cald/uad-dmsa02.pdf>>, Applications of Data Mining in Computer Security, 2002, 20 pages.

Lee, et al., "A Data Mining Framework for Building Intrusion Detection Models," retrieved at <<http://www.cs.uiuc.edu/class/fa05/cs591han/papers/leeISS00.pdf>>, IEEE Symposium on Security and Privacy, 1999, 20 pages.

Sekar, et al., "Specification-based Anomaly Detection: A New Approach for Detecting Network Intrusions," retrieved at <<http://seclab.cs.sunysb.edu/sekar/papers/ccs02.pdf>>, CCS'02, 2002, 10 pages.

Bowring, et al., "Active Learning for Automatic Classification of Software Behavior," retrieved at <<http://www-static.cc.gatech.edu/aristotle/Publications/Papers/p398-bowring.pdf>>, ISSTA'04, 2004, 11 pages.

* cited by examiner

Illustrative Analyst Interface

UI View 1

| AE ID | User Label | Predicted Label | Rank | Candidate Score(s) ... | Feature(s) ... |
|---|---|---|---|---|---|
| Z8 | Proxy | Proxy | 0 | ... | ... |
| Z11 | None | SEScan | 1 | | |
| Z3 | None | SMS | 2 | | |
| ⋮ | ⋮ | ⋮ | ⋮ | ⋮ | ⋮ |

• • •

(Optional Other Display Information)

ANALYSIS OF COMPUTER NETWORK ACTIVITY BY SUCCESSIVELY REMOVING ACCEPTED TYPES OF ACCESS EVENTS

BACKGROUND

Different types of malicious activity may affect a computer network. In a first type of activity, an entity (such as a user) may utilize resources within the computer network in an unauthorized manner. For example, a user may attempt to retrieve files from a database to which he or she has no access privileges. In a second type of activity, an entity may "infect" resources with malware of various types. For example, an entity may install spyware on a machine within the computer network; once activated, that spyware may accesses a remote server in an unauthorized manner or perform some other undesirable action. In either case, malicious activity can cause significant damage to the computer network. It can also result in security breaches that jeopardize sensitive information (such as financial information, patient record information, and so on).

Understandably, organizations and other affected parties remain highly motivated to reduce the risk of malicious activity in computer networks. In one approach, a corporation may provide a network security tool for automatically detecting and acting on incidents of malicious activity. For example, such a tool may provide a database of heuristic rules. These rules may express the characteristics of different types of known malicious behavior. If the tool discovers behavior that matches a rule, it can take actions to terminate the malicious activity, or at least mitigate its effects.

But known tools are not fully satisfactory. Malicious activity exhibits a vast number of different strategies. Further, these strategies quickly evolve. Hence, a tool that relies on a fixed database of rules may fail to detect all types of malicious activity. To address this concern, a tool may provide an interface which allows a human analyst to manually investigate incidents of possible malicious behavior. However, a computer network handles an enormous number of transactions, even within a relatively short span of time. Hence, this type of interactive approach can quickly become burdensome to the analyst, who may be asked to investigate an overwhelming number of incidents.

SUMMARY

An analysis system is described for analyzing network activity using an iterative and interactive technique. The analysis system begins by receiving a collection of access event (AE) items from a computer network. Each AE item pertains to a connection made in the computer network between a first entity and a second entity. For example, the first entity may correspond to a user or a machine of any type; likewise, the second entity may correspond to a user or a machine of any type. The analysis system then interacts with a user (e.g., a human analyst) to successively identify and remove accepted types of network activity. As a result of this operation, the analysis system can reveal, in piecemeal fashion, network activity to the user that may be problematic.

Viewed from another perspective, the computer network can be thought of as hosting different types of network activity. The different types of network activity, in turn, can be informally viewed as different sub-networks within the computer network as a whole. The analysis system can successively strip away acceptable (non-malicious) sub-networks to more effectively reveal potentially malicious network sub-networks.

According to one illustrative implementation, the analysis system interacts with the user by inviting the user to investigate selected candidate AE items, chosen from a typically large number of AE items. The user responds by applying labels to one or more of these candidate AE items. The analysis system receives these labels and, in response, updates its modeling functionality. The analysis system then generates new candidate AE items for consideration by the user.

In one approach, the analysis system can use active learning to identify the AE items which the user is asked to label. In an active learning approach, the analysis system identifies items for labeling which are most likely to improve the rate at which the system learns.

More specifically, according to one illustrative implementation, the analysis system identifies candidate items using a combination of feature-based analysis and graph-based analysis. The feature-based analysis identifies candidate AE items by analyzing individual features associated with the AE items, e.g., using a multi-class classifier module in combination with an anomaly assessment module. The graph-based analysis module identifies candidate items by analyzing graph structure associated with the AE items. In one implementation, the graph-based analysis module may use an entropy score to help identify viable candidate AE items.

By virtue of the above-summarized approach, the analysis system provides a flexible way to identify different types of malicious activity. For example, the analysis system is well-equipped to handle new types of threats in the computer network. Further, the analysis system effectively manages the amount of analysis that the user is asked to perform. It performs this task by using active learning to assist the user in prioritizing the task of applying labels to AE items. This prevents the analysis system from overwhelming the user with too much information. That is, active learning increases the rate at which the analysis system learns; as a result, the analysis system reduces the number of AE items that the user is asked to label (compared to a system which does not use active learning).

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10 shows an illustrative interface, generated by the analysis system of FIG. 3, by which a user can interact with the analysis system.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an overview of an analysis system that is used to iteratively and interactively identify malicious activity within a computer network. Section B describes a collection system that is used to supply access event items for processing by the analysis system. Section C provides additional details regarding an activity classification module used by the analysis system, comprising a feature-based analysis module and a graph-based analysis module. Section D describes illustrative processing functionality that can be used to implement any aspect of the features described in any of the foregoing sections.

This application is related to copending and commonly assigned U.S. patent application Ser. No. 11/871,587 (the '587 Application), entitled "Active Learning Using a Discriminative Classifier and a Generative Model to Detect and/or Prevent Malicious Behavior," filed on Oct. 12, 2007, naming the inventors of Jack W. Stokes, et al. The '587 Application is incorporated herein by reference in its entirety.

Figure 19:
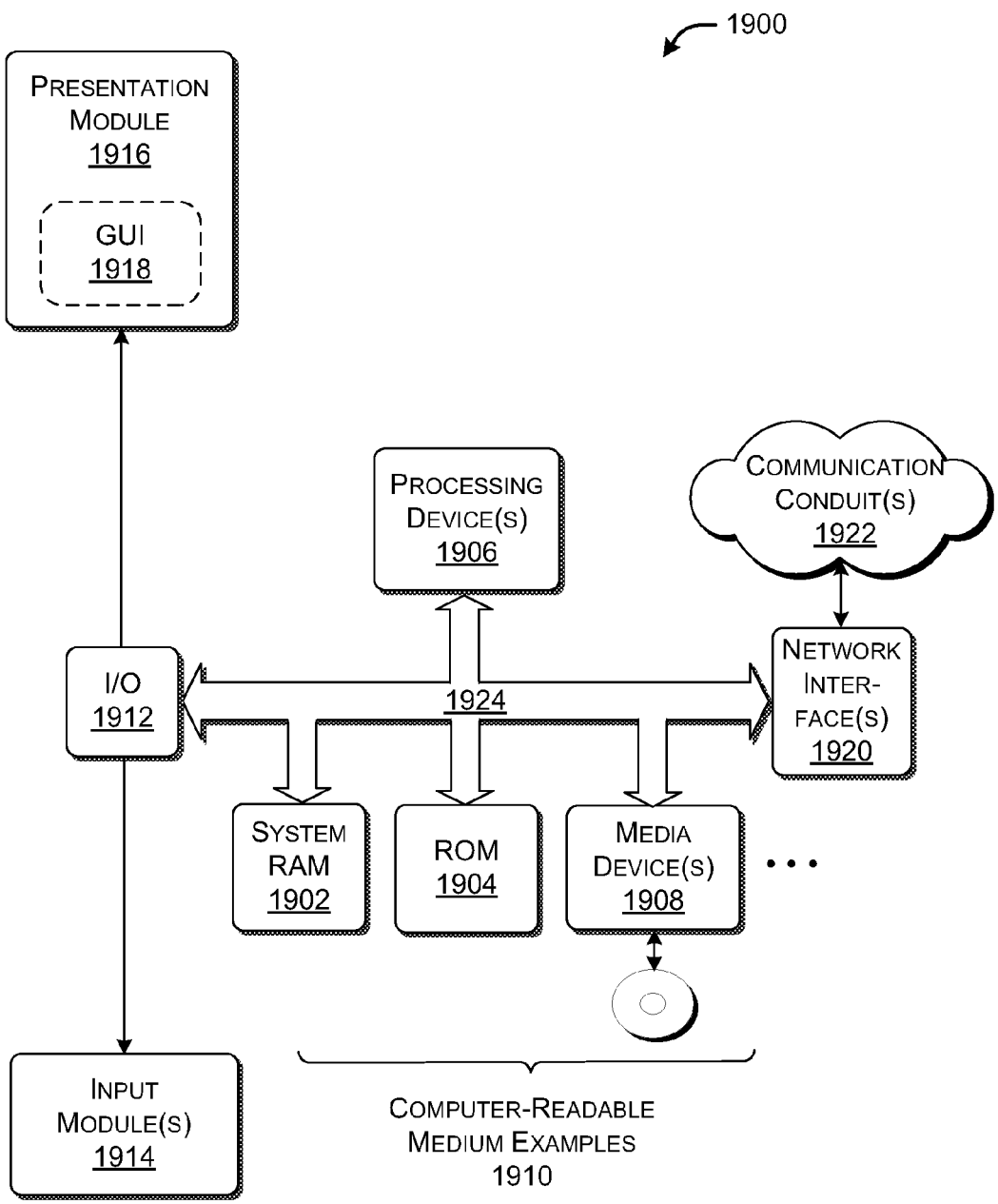
FIG. 19 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 19, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

The following explanation may identify one or more features as "optional." This type of statement is not to be interpreted as an exhaustive indication of features that may be considered optional; that is, other features can be considered as optional, although not expressly identified in the text. Similarly, the explanation may indicate that one or more features can be implemented in the plural (that is, by providing more than one of the features). This statement is not be interpreted as an exhaustive indication of features that can be duplicated. Finally, the terms "exemplary" or "illustrative" refer to one implementation among potentially many implementations.

A. Overview of the Analysis System

Figure 1:
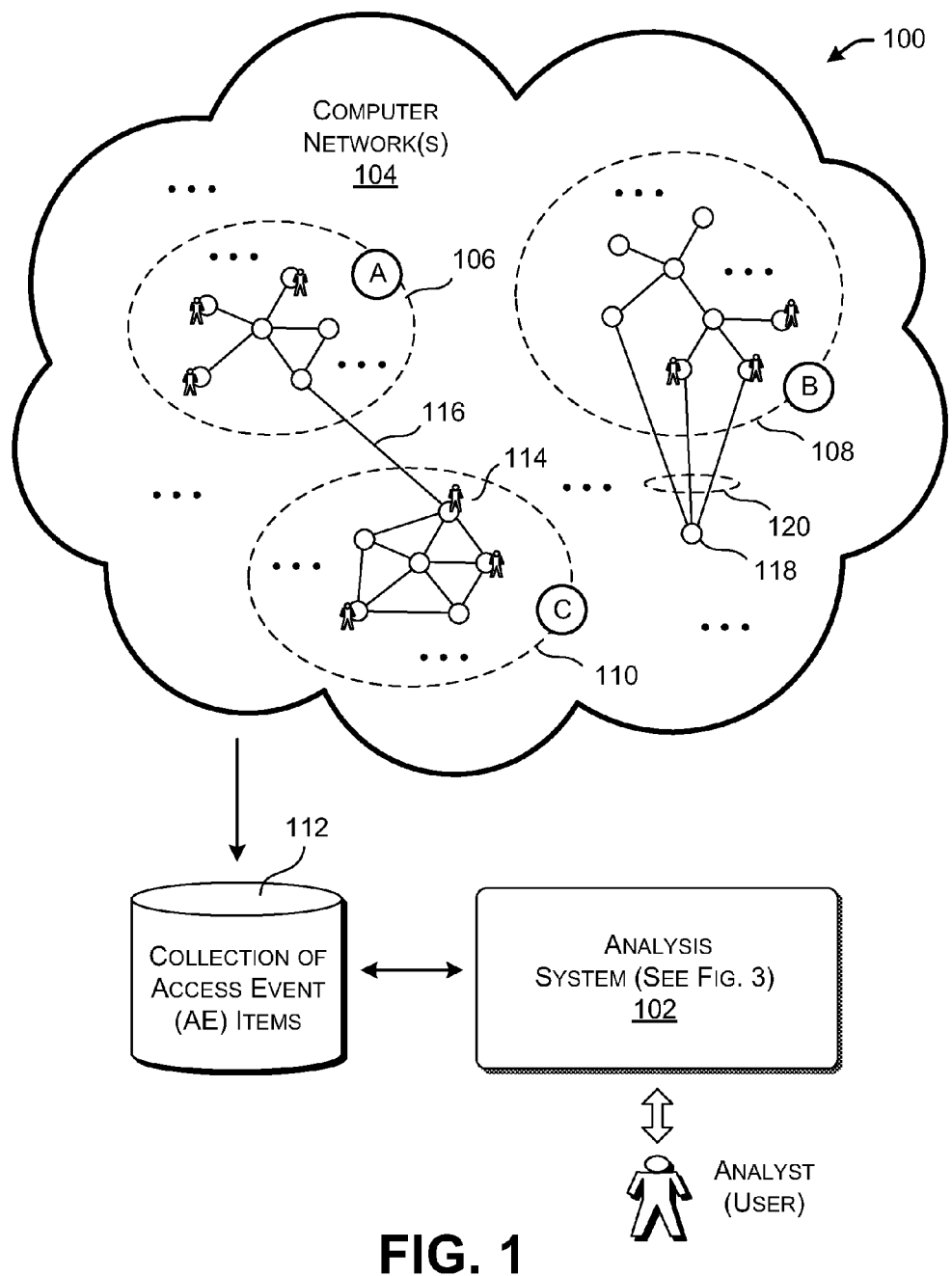
FIG. 1 shows an illustrative environment in which an analysis system is used to identify malicious activity within a computer network.

FIG. 1 shows a high-level view of an environment 100 in which an analysis system 102 is used to analyze activity occurring within a computer network 104. In one environment, the computer network 104 corresponds to network infrastructure provided by an organization of any type, such as a business entity, a governmental entity, an educational entity, and so on. Or the computer network 104 can correspond to network infrastructure associated with plural organizations, such as plural affiliates of a business entity, etc. In another environment 100, the computer network 104 corresponds to functionality implemented, at least in part, using public network infrastructure, such as a wide area network (such as the Internet).

In any case, the computer network 104 includes any collection of machines of any type. For example, the computer network 104 can include computing machines for operation by users, such as personal computers, workstations, laptop computers, personal digital assistant devices, mobile telephones, set-top boxes, game consoles, and so on. The computer network 104 can also include other equipment, such as servers, routers, data stores, and so on. The computer network 104 can also include any combination of hardwired links, wireless links, etc. The computer network 104 can be governed by any protocol or combination of protocols. It can be provided at a single geographic location or it can be distributed over plural geographic locations.

The computer network 104 enables any first entity to connect to any second entity for any purpose. In aggregate, the computer network accommodates many such connections at any given time. The first entity can correspond to a machine of any type or a user (e.g., a user account). In one implementation, the second entity can correspond to a machine of any type. In other implementations, the second entity can correspond to machine or a user. Thus, a first type of connection can correspond to a connection between two user accounts. A second type of connection can correspond to a connection between two machines. A third type of connection can correspond to a connection between a user and a machine. It should be noted, of course, that a user operates a machine of some type to interact with another entity. Stating that the first and/or second entity is a user means that the entity is primarily identified, for the purposes of analysis, as a user account, rather than a particular machine, a machine account.

By way of terminology, an access event (AE) refers to a connection between a first entity and a second entity. An access event (AE) item refers to any information which describes an access event. In one implementation, a collection of AE items can be formulated as a master graph. An individual AE item within the master graph corresponds to any source node (associated with a first entity) and target node (associated with the second entity), connected by an edge. As will be described, an AE is also associated with a collection of features. The features refer to attributes of the AE item. For example, in the case that a source node corresponds to a machine, one feature describes services (e.g., applications) provided by that machine. A feature may also be associated with a characteristic of the connection itself. For example, a feature may identify the number of times a connection is made over a period of time (e.g., an hour, day, week, etc.). Section C describes yet other illustrative features. A data store 112 can store AE items collected from the computer network 104.

FIG. 1 shows a high-level view of different types of network activities that may be occurring within a computer network 104 over a span of time. For example, a first collection of access events 106 corresponds to a first type of activity, labeled as activity "A." A second collection of access events 108 corresponds to a second type of activity, labeled as activity "B." A third collection of access events 110 corresponds to a third type of activity, labeled as activity "C." This is a small representative sample presented for explanation purposes; an actual computer network will accommodate potentially many more types of activities.

To provide concrete examples, activity "A" may correspond to the use of a group printer that is located in a particular building of an organization. Activity "B" may correspond to interaction between members of a high-security clearance group and a secure database. Activity "C" may correspond to a mesh-type of interaction that occurs among users (and machines) in a laboratory of the organization. In some cases, a user's direct attempt to contact another user or machine may trigger other connections. For example, the user may attempt to access a server to obtain his or her Email messages. That connection may trigger interaction with a security scanning service provided by another server within the organization. (As an aside, the examples presented herein pertain to an organizational setting; but the principles described can be applied to other environments, such as a wide area network setting.)

FIG. 1 presents only a few distinct activities to simplify illustration. But in an actual organization, any entity in the graph may be involved in many different types of activities. For example, a desktop computer may connect to a printer (according to one pattern of activity) and access data from a corporate database server (according to another pattern of activity). For this reason, FIG. 1 could be drawn as a plurality of activity patterns which are overlaid on the same entities.

Generally, the analysis system 102 operates to identify and clarify the nature of these activity patterns, e.g., by mapping AE items to appropriate activity categories. In doing so, the analysis system 102 attempts to detect malicious activity that may be occurring (or has occurred) within the computer network 104. As used herein, malicious activity encompasses any activity that an organization (or other policy-setting entity) defines as unacceptable or undesirable for any reason. In some cases, malicious activity can correspond to unauthorized access by an entity to computer resources within the computer network 104. For example, a user may attempt to access records to which he or she is not authorized. In other cases, malicious activity can correspond to malware or user activity that is performing unwanted actions within the computer network 104. For example, a BOT may be surreptitiously sending classified information from within an organization to an entity outside the organization. Similarly, no limitation is placed on what a policy-setting entity may regard as acceptable or non-malicious.

The analysis system 102 operates by receiving a collection of AE items from the computer network 104 with the assistance of a collection system (not shown in FIG. 1, but described in Section B). The analysis system 102 then operates on these AE items to successively identify and remove instances of acceptable network activity. The analysis system 102 performs this iterative operation through interaction with a user (e.g., a human analyst). For example, the analysis system 102 invites the user to successively label AE items. Form the user's perspective, "removal" refers to any type of bracketing out of certain types of AE items, by which the AE items are effectively withdrawn from further consideration by the user. That is, the removed AE items may be de-emphasized in any manner to be described below (but the AE items need not be literally removed). From an underlying technical standpoint, removal may correspond to removing an edge from the master graph.

In the course of this iterative behavior, the analysis system 102 increasingly reveals potentially problematic network activity within the computer network 104 (if, in fact, the computer network 104 exhibits such behavior). For example, assume that the types of network activity labeled as "A," "B," and "C" are acceptable (non-malicious) types of network activity. When these types of activities are effectively "removed," the analysis system 102 can focus the user's attention on remaining network activity, which may or may not represent malicious activity.

For example, in a first merely illustrative scenario, assume that a user 114 is using his computer in his own division to access a group of computers in another division of the organization. This activity, represented by connection 116, may or may not be proper; in the worst case, this user 114 may be attempting to obtain confidential information for malicious purposes. In a second merely illustrative scenario, assume that various machines are accessing a server 118 at the same time. This activity, represented by connections 120, may or may not be proper; in the worst case, this activity represents malicious BOTs that are accessing the server 118 in an unauthorized manner. Upon learning of malicious activity, a response system (not shown in FIG. 1) can take any type of appropriate action to terminate or otherwise address the activity, to be discussed below.

From another perspective, the computer network 104 can be thought of as hosting different types of network activity. The different types of network activity, in turn, can be informally viewed as different sub-networks within the computer network 104 as a whole. The analysis system 102 can successively strip away acceptable (non-malicious) sub-networks to more effectively reveal potentially malicious network sub-networks.

Figure 2:
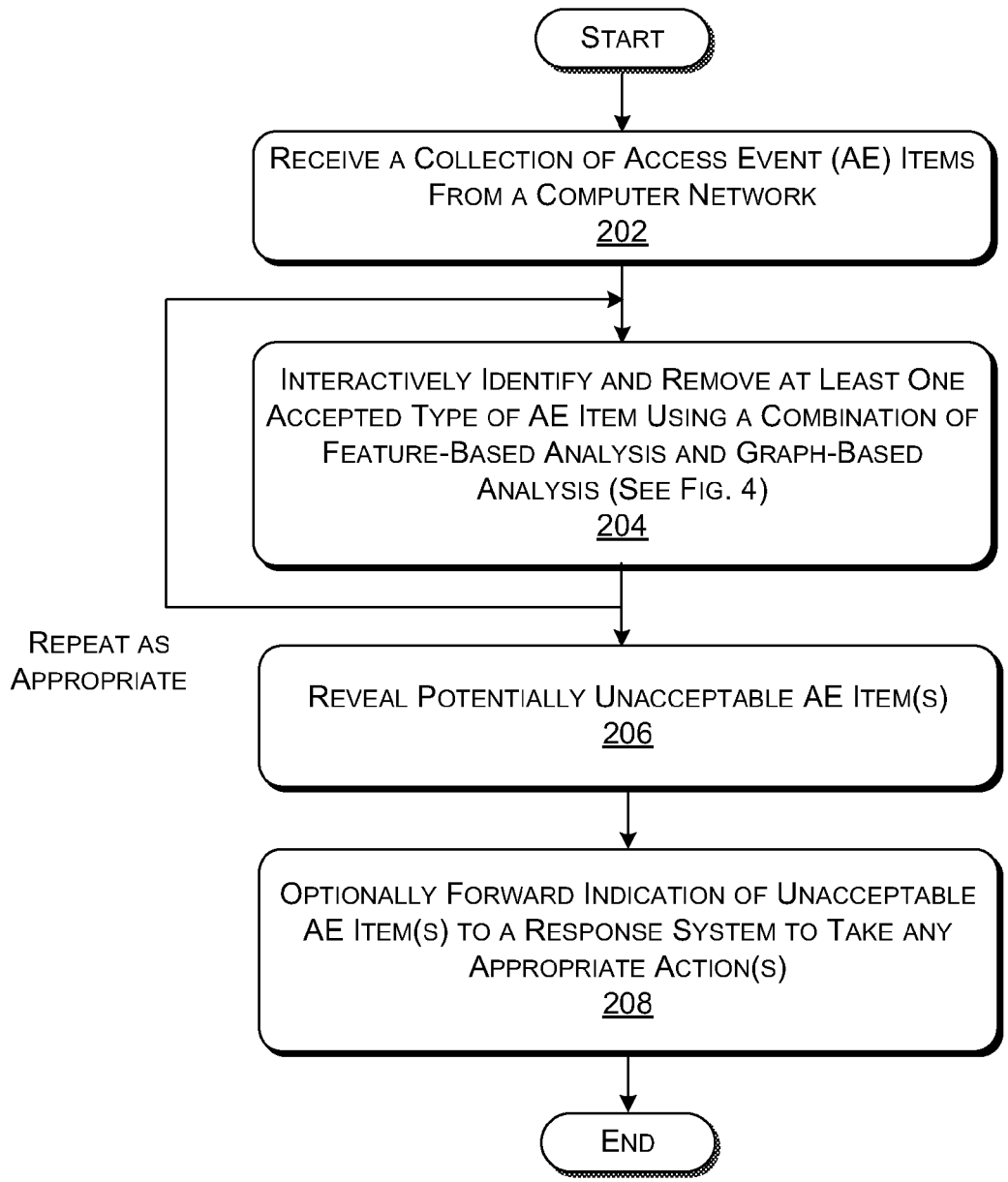
FIG. 2 is a flowchart that describes an overview of one manner of operation of the analysis system of FIG. 1.

FIG. 2 shows a procedure 200 that summarizes the above explanation in flowchart form. In block 202, the analysis system 102 receives a collection of AE items from the computer network 104 (in a manner to be described in Section B). In block 204, the analysis system 102 successively identifies and removes at least one accepted type of AE item. The analysis system 102 performs this operation using a combination of feature-based analysis and graph-based analysis (to be discussed below). In block 206, the analysis system 102 reveals potentially unacceptable AE items. In one case, the AE items that remain may be evidently problematic—that is, malicious on their respective faces. Alternatively, or in addition, the analysis system 102 can perform additional analysis and/or inquiry to assess whether the remaining AE items are indeed malicious in nature. In block 208, the analysis system 102 optionally contacts a response system to take action to mitigate the effects of any identified malicious activity.

Figure 3:
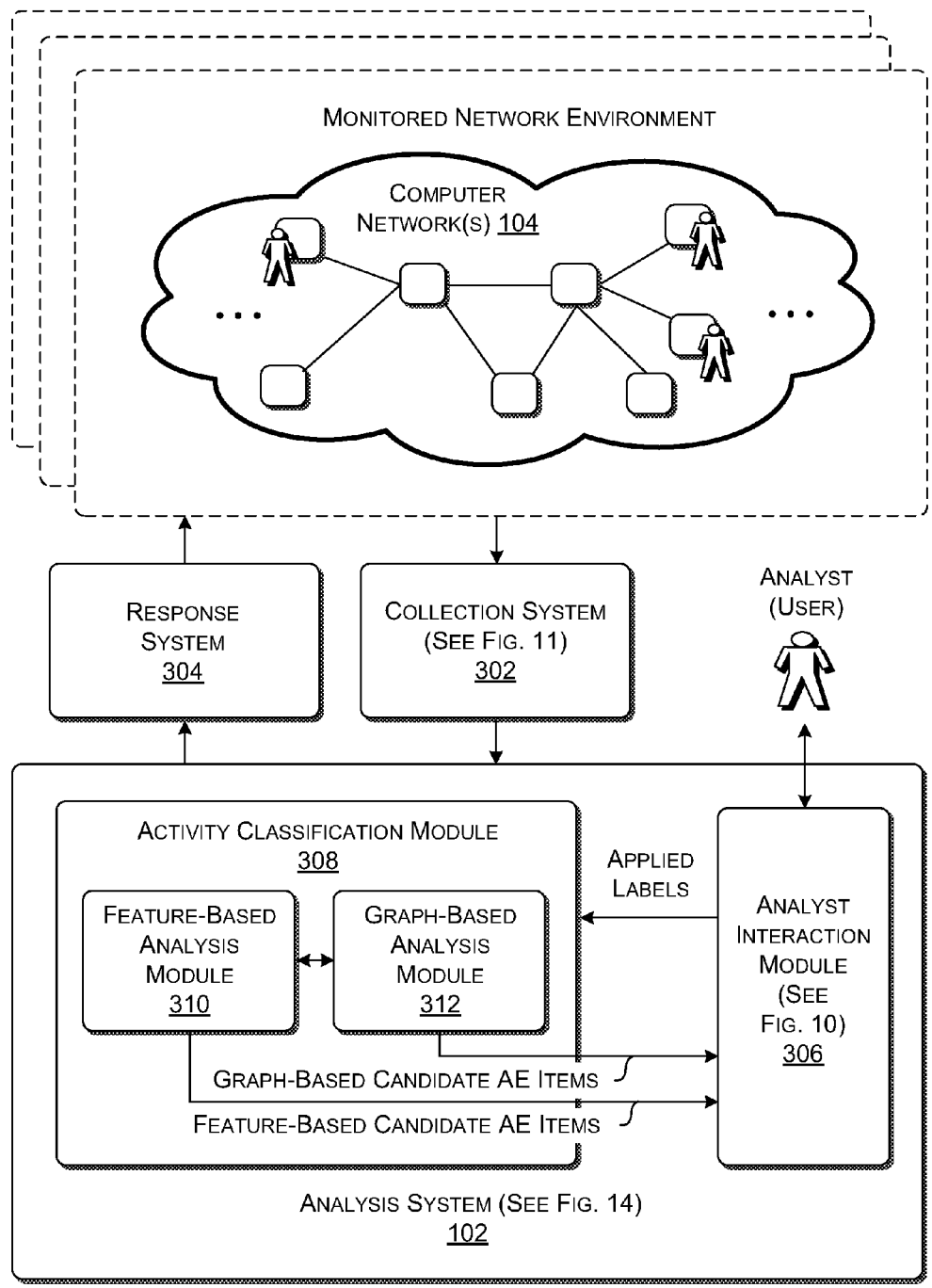
FIG. 3 shows one implementation of the analysis system of FIG. 1, employing a feature-based analysis module and a graph-based analysis module.
Figure 14:
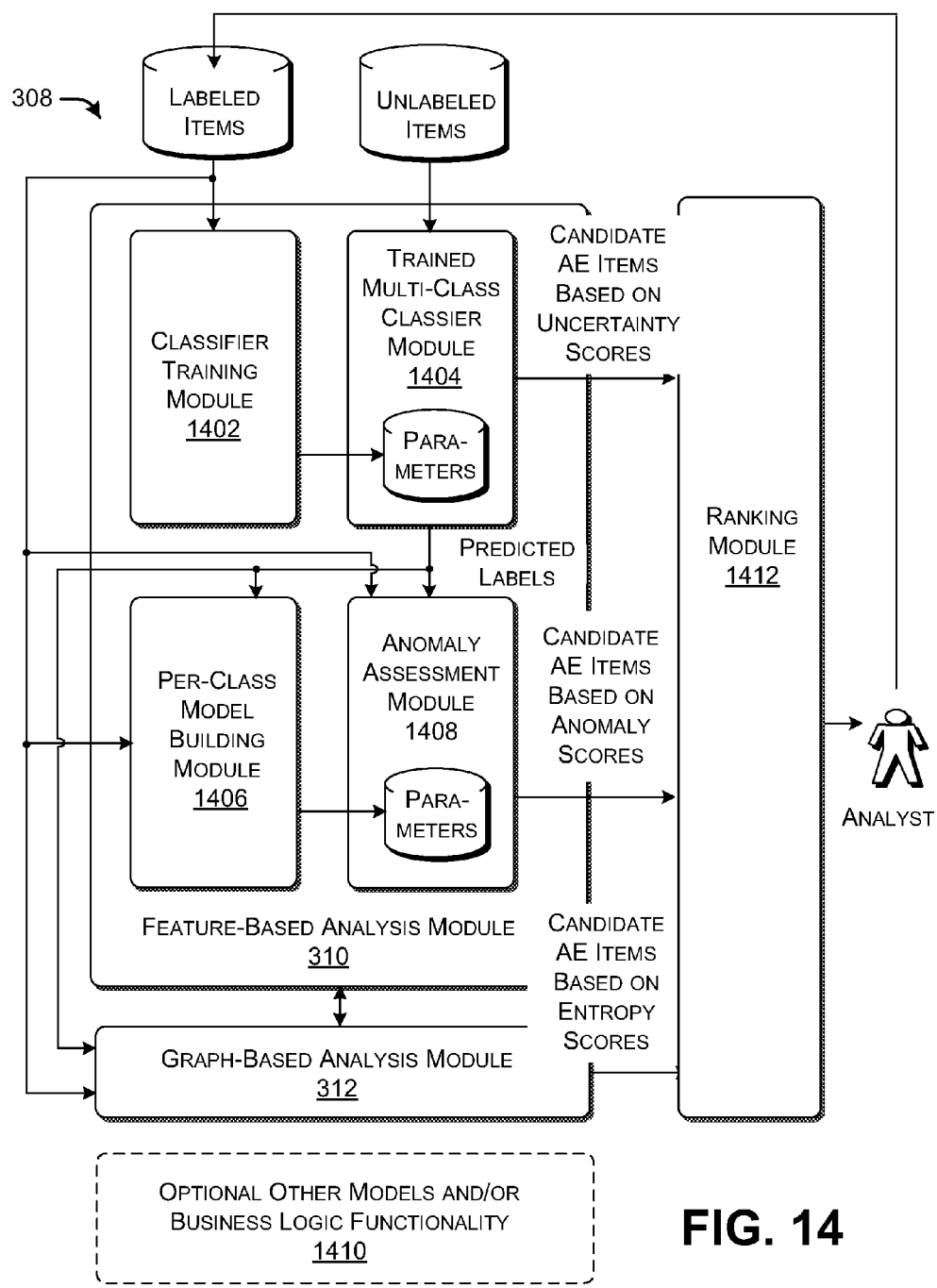
FIG. 14 show one implementation of an activity classification module used in the analysis system of FIG. 3.

Advancing to FIG. 3, this figure shows a more detailed view of one implementation of the analysis system 102. FIG. 14, to be discussed below in turn, provides a yet more detailed depiction of parts of the analysis system 102.

To begin with, a collection system 302 collects AE items from the computer network 104. The AE items describe connections made in the computer network 104 over any span of time. A response system 304 takes actions based on the conclusions of the analysis system 102. For example, the response system 304 can automatically take actions to disable malicious activity, such as by preventing a user or machine from contacting another user or machine. Alternatively, or in addition, the response system 304 can notify appropriate entities (e.g., users) of the malicious activity. For example, the response system 304 can notify the user who happens to be the source or target of malicious activity. Alternatively, or in addition, the response system 304 can notify appropriate managers, security personnel, security tools, etc.

The analysis system 102 itself can include an analyst interaction module 306. The analysis interaction module 306 provides any type of interface (or any combination of interfaces) by which a user (e.g., a human analyst) can interact with the analysis system 102. More specifically, the analysis interaction module 306 provides an interface through which the user and analysis system 102 can cooperatively and iteratively label network activity occurring with the computer network 104.

In this interactive process, the analysis system 102 uses an active learning approach to select representative AE items, referred to herein as candidate AE items, from a larger body of AE items. It then presents these candidate AE items to the user via the analyst interaction module 306. As will be explained in greater detail below, the analysis system 102 chooses the candidate AE items because it has assessed that these items, once labeled, will have the ability to clarify the nature of the activity occurring within the computer network 104. In other words, these candidate AE items are actively selected to accelerate learning by the analysis system 102. The user can then apply labels to one or more of these candidate AE items via the analyst interaction module 306. Upon receipt, the analysis system 102 updates its modeling functionality based on the new labels, causing it to provide another set of candidate AE items to the user for his or her consideration. FIG. 10 shows one (among many) possible implementations of an interface provided by the analyst interaction module 306.

The analysis system 102 also includes an activity classification module 308. The activity classification module 308 performs various types of analysis on the AE items. In the context of the above-summarized interactive procedure, the activity classification module 308 identifies the candidate AE items to be sent to the user. In one implementation, the activity classification module 308 communicates its candidate AE items by selectively highlighting certain items from a larger list of items. For example, the analysis classification module 308 can rank candidate AE items within a list of items, enabling the candidate AE items to be prominently displayed at the top of the list (or at some other prominent location). The user is thereby invited to apply labels to high-ranking AE items. To provide this ranking, the activity classification module 308 may assign different types of scores to the AE items, enabling them to be ranked.

More specifically, the activity classification module 308 can include a feature-based analysis module 310 and a graph-based analysis module 312. The feature-based analysis module 310 performs analysis of AE items based on features (e.g., attributes) associated with the AE items. The feature-based analysis module 310 generates feature-based scores, which can be used to identify candidate AE items. The graph-based analysis module 312 performs analysis of AE items based on graph structure associated with the AE items. The graph-based analysis module 312 can be used to generate graph-based scores, which can be used to identify candidate AE items.

Stated in other terms, the feature-based analysis module 310 performs a type of classificatory analysis on the AE items by considering the AE items as independent objects of analysis. The graph-based analysis module 312 more globally and directly considers patterns within a collection of connected AE items. The graph-based analysis module 312 may use the labeling results provided by the feature-based analysis module 310. For this reason, the graph-based analysis module 312 can be considered as performing a "higher" level of analysis compared to the feature-based analysis module 310. Later figures and accompanying description set forth different ways in which the feature-based analysis module 310 and the graph-based analysis module 312 can be combined together to identify the candidate AE items.

From one perspective, the graph-based analysis module 312 provides additional evidence which indicates whether or not the conclusions of the feature-based analysis module 310 are correct. For example, the feature-based analysis module 310 may interact with the user to label a group of AE items as "DC Queries," indicating that these AE items correspond to domain controller queries. The graph-based analysis module 312 may determine that these AE items form a star-type connection or any other telltale pattern. This observation by the graph-based analysis module 312 helps confirm the accuracy of the feature-based analysis; this is because the AE items that are grouped together by the feature-based analysis module 310 can be validated through some reasoning that is independent or outside the scope of the feature-based analysis. In addition, or alternatively, the analysis system 102 can use other explanatory variables to help confirm or refute the conclusions of the feature-based analysis module 310. Generally, classifications that can be "explained" by some supplemental analysis are more likely to be correct (compared to those classifications that cannot be explained).

Figure 4:
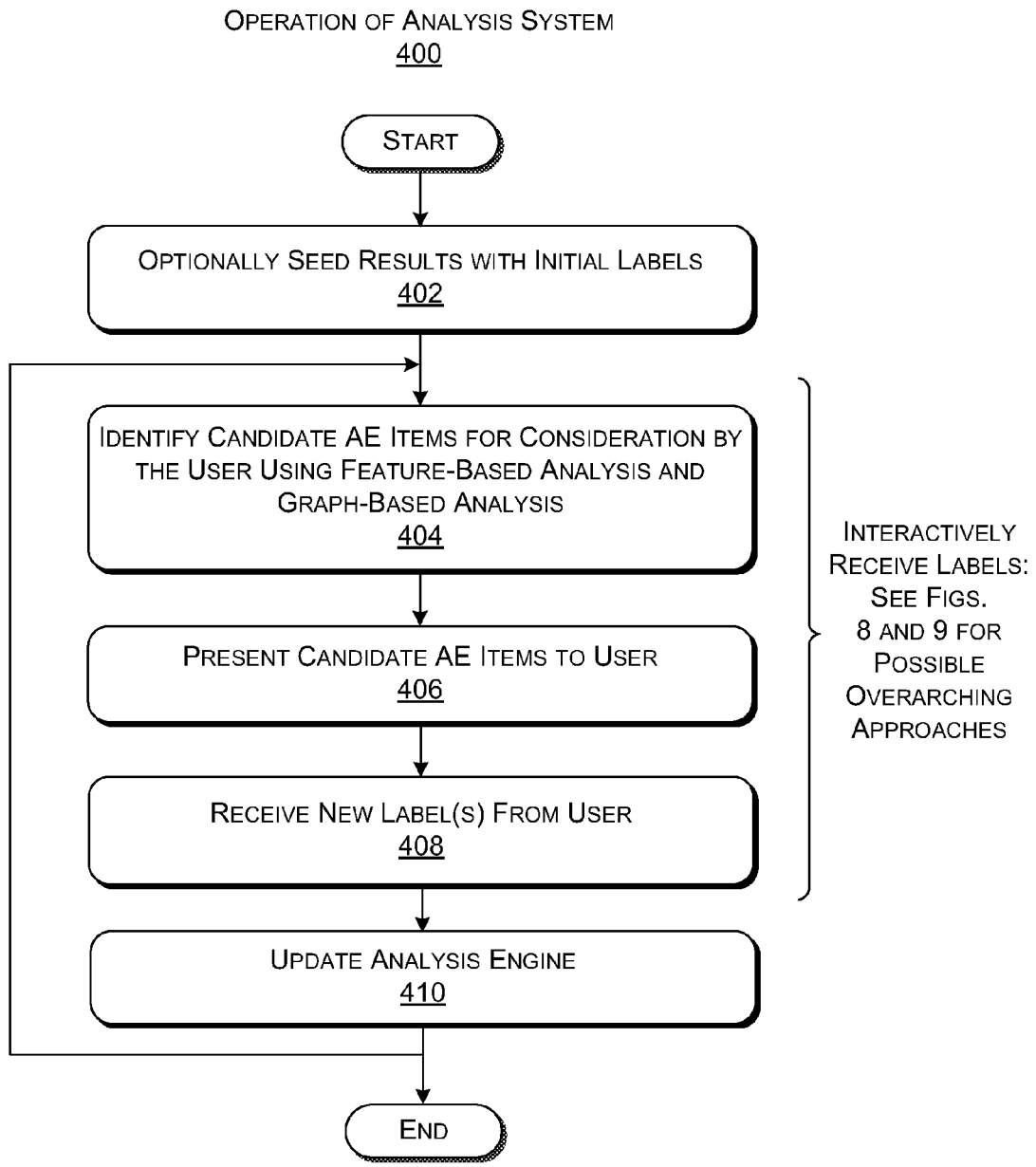
FIG. 4 shows is a flowchart that describes one manner of operation of the analysis system of FIG. 3.

FIG. 4 shows a procedure 400 which summarizes the explanation above in flowchart form. In block 402, the analysis system 102 optionally receives a set of initial labels for some of the AE items in the collection of AE items. For example, the analysis system 102 can randomly assign labels to certain AE items. Alternatively, the analysis system 102 can apply automatic analysis which makes an initial "guess" as to the labels of certain AE items, e.g., based on any type of environmental-specific rules and considerations.

In block 404, the analysis system 102 identifies candidate AE items for consideration by the user, e.g., by inviting the user, via the analyst interaction module 306, to label these candidate AE items. In one approach, the analysis system 102 can identify the candidate AE items by ranking the AE items in the manner described above; AE items that have a high rank implicitly correspond to the candidate AE items. As stated, the analysis system 102 can use a combination of feature-based analysis and graph-based analysis to identify the candidate AE items.

In block 406, the analysis system 102 presents the candidate AE items to the user, e.g., by presenting a list of AE items to the user (as will be described with respect to FIG. 10). In block 408, the analysis system 102 receives the labels that the user assigns to one or more of the candidate AE items. In block 410, the analysis system 102 updates its modeling functionality (to be discussed) based on the new labels supplied by the user. This enables the analysis system 102 to generate an updated set of candidate items upon returning to block 404.

Figure 5:
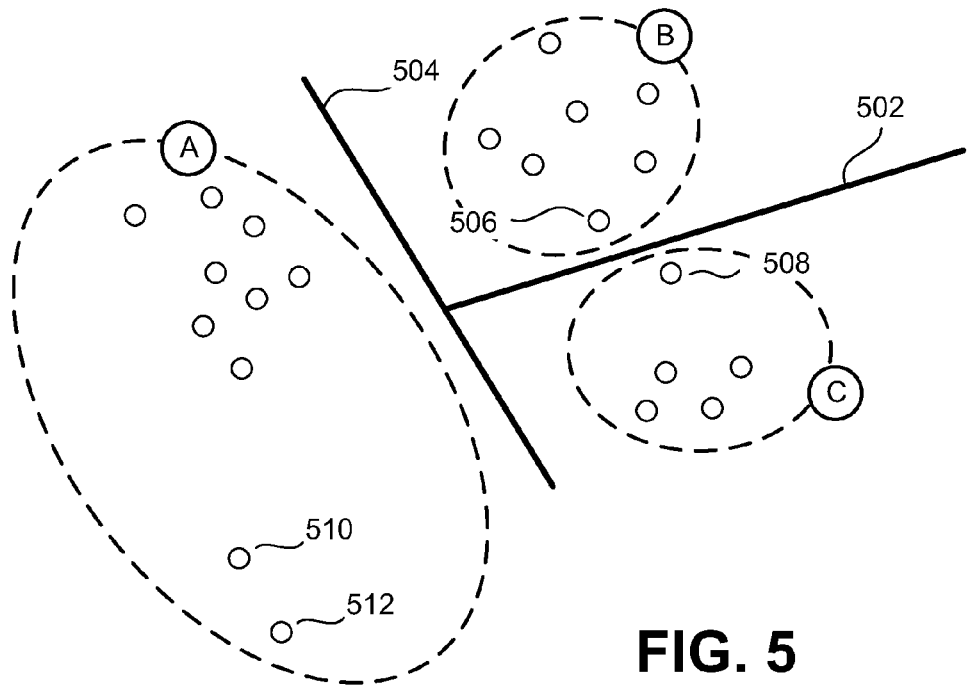
FIGS. 5 and 6 graphically depict concepts relevant to the operation of the feature-based analysis module of FIG. 3.
Figure 6:
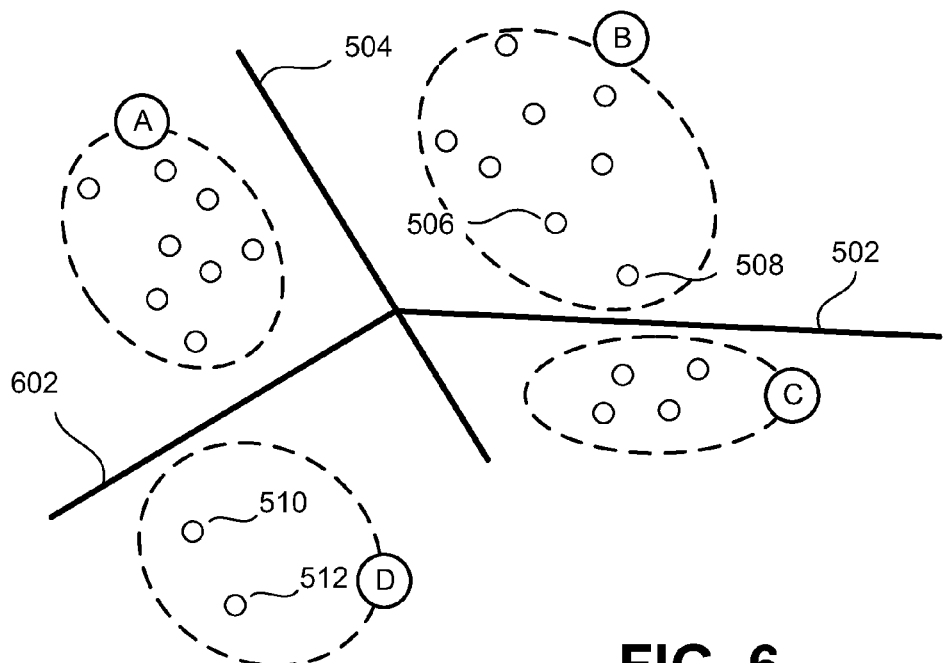

FIGS. 5 and 6 depict concepts that are pertinent to the operation of the feature-based analysis module 310. As will be discussed (with reference to FIG. 14), the feature-based analysis module 310 can include a multi-class classifier module in conjunction with a per-class anomaly assessment module. After being trained, the multi-class classifier module assigns predicted labels to a collection of unlabeled AE items. The anomaly assessment module determines how far each AE item diverges from its predicted class.

Starting with FIG. 5, this figure shows the placement of a number of AE items in feature space. (Feature space refers to a framework for placing AE items with reference to feature information associated with the AE items.) That is, each dot in this figure represents an AE item; each AE item, in turn, represents an access event in the computer network 104. Further assume that the multi-class classifier module operates to assign one of three classes to each unlabeled AE item, generically denoted by classes "A," "B," and "C." Hyperplanes 502 and 504 illustrate the boundaries that separate these classes.

The analysis system 102 can use different scores to identify good candidates for labeling by the user. One such score is an uncertainty score; another is an anomaly score. As mentioned above, a good candidate for labeling is an AE item that, once labeled, will help clarify and improve the classification of AE items.

More specifically, the multi-class classifier module can generate the uncertainty scores for the predicated labels assigned to the AE items. An uncertainty score describes a level of uncertainty associated with a predicted label. For example, AE item 506 is classified as class "A," but this AE item 506 is positioned close to the hyperplane 502. Similarly, AE item 508 is classified as class "B," but this AE item 508 also is positioned close the hyperplane 502. These predicted labels are uncertain because they lie close to neighboring classifications in feature space. These two AE items (506, 508) are therefore good candidates for labeling (by the user); this is because their resolution will clarify the proper placement of the hyperplane 502 and improve the quality of classification.

The anomaly assessment module generates the anomaly scores for the predicted labels assigned to the AE items. An anomaly score describes a level of unusualness associated with a predicted label. For example, AE items 510 and 512 are positioned relatively far from the "center of weight" of the other AE items assigned the class "A." Hence, AE items 510 and 512 are anomalous with respect to the cluster of other AE items in this class. These two AE items (510, 512) are good candidates for labeling (by the user) because their resolution will help resolve the classification of AE items that may be (or may not be) incorrect.

Assume now that the user operates the analyst interaction module 306 to label AE item 506 as belonging to class "B" (thus confirming the predicted label). Further assume that the user labels AE item 508 as belonging to class "B" (thus contradicting the predicted label). Further assume that the user adopts an entirely new label, label "D," to describe AE items 510 and 512. FIG. 6 shows the outcome of these labeling operations. First, the position of the hyperplane 502 is adjusted to account for the labeling of AE item 508 as class "B," instead of class "C." Second, the multi-class classifier module now establishes a new class type, class "D." A hyperplane 602 separates class "A" from class "D."

Figure 7:
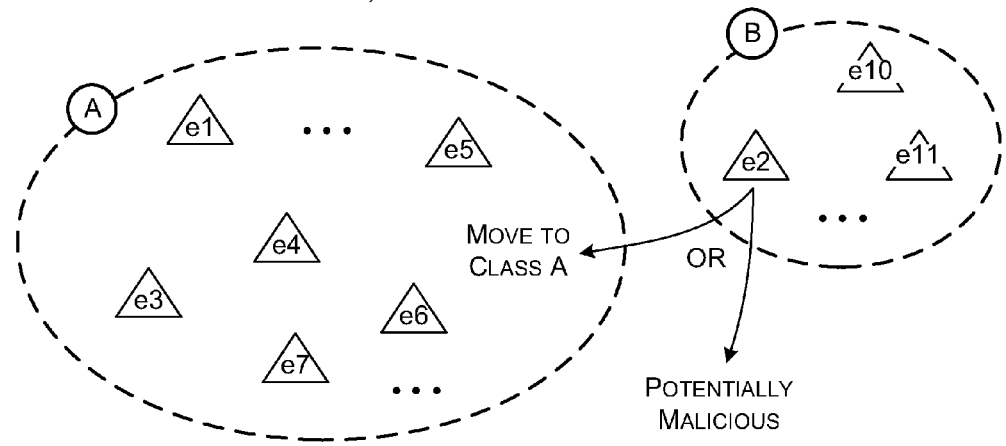
FIG. 7 graphically depicts concepts relevant to the operation of the graph-based analysis module of FIG. 3.

FIG. 7 depicts concepts that are pertinent to the operation of the graph-based analysis module 312. The graph-based analysis module 312 performs analysis with respect to a graph structure associated with the AE items, rather than a feature-space analysis of the AE items. More specifically, as will be described in greater detail in Section C, the entire collection of AE items defines a master graph. The graph-based analysis module 312 performs analysis with respect to a plurality of portions of the master graph. FIG. 7 shows one representative graph portion 700 (also referred to as a connected component in the explanation of Section C). The graph portion 700 provides a collection of connected AE items. Each AE item in the graph portion 700 corresponds to an edge which connects a source node and a destination node. In the case of FIG. 7, the graph portion 700 includes at least seven edges, labeled e1-e7. Assume that edges e1, e3, e4, e5, e6, and e7 have been assigned the class "A" (by the user and/or the feature-based analysis module 310), while edge e2 has been assigned the class e2.

The graph-based analysis module 312 analyzes the characteristics of the graph portion 700 (along with other graph portions, not shown) to identify edges (and corresponding AE items) that are good candidates for consideration by the user. In one merely illustrative case, the graph-based analysis module 312 assesses the entropy of the distribution of labels in the graph portion 700. This metric generally corresponds to a level of purity (e.g., uniformity) of the labels for the graph portion 700. In one case, the graph-based analysis module 312 finds the graph portions having the lowest label entropy. The graph-based analysis module 312 can then identify the outlier edge(s) (i.e., edges that are labeled differently from the rest) in such a graph portion as good candidates for labeling. For example, the graph-based analysis module 312 may identify edge e2 (and its associated AE item) as a good candidate for labeling; this is because this edge is an outlier edge in a graph portion 700 that otherwise has relatively high purity (uniformity).

More generally stated, the graph-based analysis module 312 can select edges based on the characteristics of the graph portions in conjunction with one or more selection rules. For example, another selection rule can direct the graph-based analysis module 312 to pick one of the type "A" edges in the graph portion 700 as a candidate for labeling. This selection will enable the user to confirm the accuracy of the class "A" labels assigned to most of the edges in the graph portion 700.

Assume now that the user is invited to apply a label to edge e2 (and its corresponding AE item). In one scenario, the user may decide that edge e2 is properly classified as class "A," not class "B." In a second scenario, the user may decide that edge e2 corresponds to malicious activity. Still other classifications are possible. The bottom portion of FIG. 7 illustrates the consequences of the user's decision within feature space.

In the example of FIG. 7, note that the graph-based analysis module 312 performs analysis, in part, based on predicted labels supplied by the feature-based analysis module 310. Thus, in one implementation, the graph-based analysis module relies on the low-level output of the feature-based analysis module 310.

Figure 8:
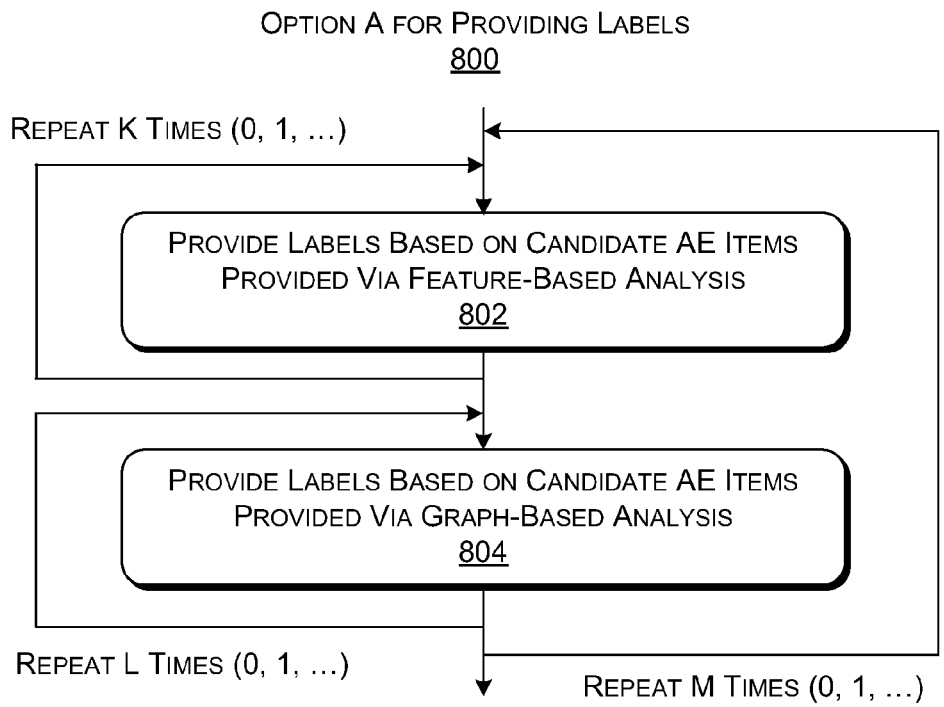
FIG. 8 is a flowchart that describes one manner of combining the operations of the feature-based analysis module and the graph-based analysis module of FIG. 3.
Figure 9:
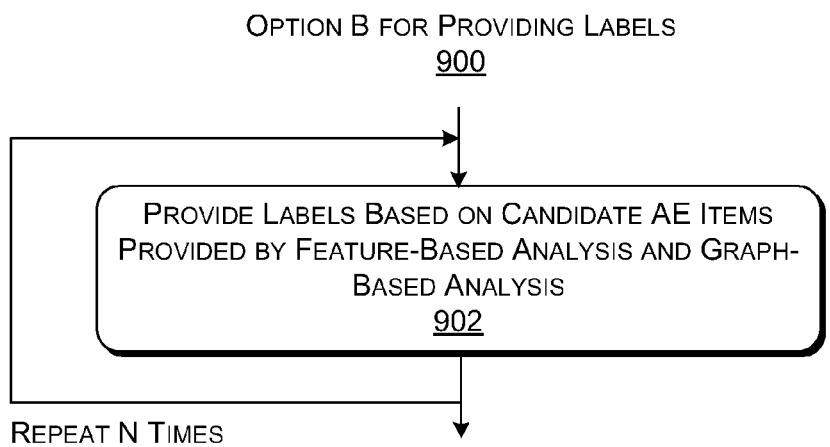
FIG. 9 is a flowchart that describes another manner of combining the operations of the feature-based analysis module and the graph-based analysis module of FIG. 3.

FIGS. 8 and 9 show two ways that the analysis system 102 can apply the feature-based analysis module 310 and the graph-based analysis module 312 to identify the candidate AE items. Starting with FIG. 8, this figure shows a procedure 800 in which the feature-based analysis module 310 and the graph-based analysis module 312 are applied in succession. Namely, in block 802, the analysis system 102 cooperatively works with the user to apply labels to AE items based on feature-based analysis (e.g., where the candidate items are supplied to the user based on feature-based analysis). This operation can be repeated K times. In block 804, the analysis system 102 cooperatively works with the user to apply labels to AE items based on graph-based analysis (e.g., where the candidate items are supplied to the user based on graph-based analysis). This operation can be repeated L times. FIG. 8 indicates that this entire procedure can be repeated M times. In another implementation, block 804 can proceed block 802 in the procedure 800.

FIG. 9 shows a procedure 900 in which the feature-based analysis module 310 and the graph-based analysis module 312 are applied together in an integrated operation. Namely, in block 902, the analysis system 102 cooperatively works with the user to apply labels to AE items based on both feature-based analysis and graph-based analysis. This procedure can be repeated N times. For example, in this mode, the analysis system 102 can present candidate AE items to the user that are gleaned from both feature-based analysis and graph-based analysis; the user may consider both types of candidate items in applying labels to AE items. In another implementation, aspects of the procedure 800 of FIG. 8 can be combined with aspects of the procedure 900 of FIG. 9.

FIG. 10 shows one illustrative interface 1000 (e.g., a graphical user interface) that can be generated by the analysis interaction module 306. Generally, the interface 1000 conveys different fields of information regarding the AE items collected by the collection system 302. For example, in a first column, the interface 1000 may provide a list of identifiers assigned to the AE items. In a next column, the interface 1000 may identify user labels assigned to various AE items. Assume that the user has assigned the label "proxy" to the first-listed AE item (having an ID of "Z8"). At this juncture, the user has not assigned a label to the second or third AE items.

In a next column, the interface 1000 identifies the predicted label for each AE item. For example, the analysis system 102 has assigned the label "SE scan" (identifying a security scan) to second AE item in the list. In a next column, the interface 1000 identifies a rank assigned to each AE item in the list. In a next column, the interface 1000 identifies one or more candidate scores associated with each AE item. For example, the scores can include one or more scores generated by the feature-based analysis module 310 and/or one or more scores generated by the graph-based analysis module 312. In a next column, the interface 1000 identifies the features associated with each AE item.

The user can interact with the interface 1000 by examining the information imparted by the interface 1000. In particular, the interface 1000 focuses the user's attention on top-ranking candidate AE items in the list of AE items. The user may opt to apply labels to one or more of these top-ranking AE items (but is not so restricted). The user can perform this task by filling in missing fields in the "User Label" column. Alternatively, or in addition, the user can change a label assigned to an AE item that has been previously labeled by the user. Note that the interface 1000 does not ask the user to apply a large number of labels; to the contrary, at each iteration, the user is invited to respond to a relatively small number of representative AE items (referred to as candidate AE items), chosen to accelerate learning by the analysis system 102.

In one implementation, the analysis system 102 runs its analysis every time the user labels an AE item (or a collection of AE items). In another implementation, the user analysis system 102 will not perform analysis unless expressly instructed to do so by the user, e.g., in response to the user's actuation of an "Analyze" button or the like, not shown. This allows a user to label multiple AE items without automatically invoking a re-analysis of the data. In other words, this button allows the user to control when the potentially time consuming analysis is performed.

The interface 1000 shown in FIG. 10 is merely one example of how the analyst interaction module 306 may present AE item information. In this example, the analyst interaction module 306 can integrate the results of the feature-based analysis module 310 and the graph-based analysis module 312 in one display, e.g., by presenting feature-based scores together with graph-based scores. The user can change the ranking mode by clicking on an appropriate column heading of a type of score. In another format, the analyst interaction module 306 can provide a dedicated interface that allows a user to interact with the feature-based analysis module 310, and another dedicated interface that allows the user to interact with the graph-based analysis module 312.

Further, the interface 1000 can adopt other strategies to convey the candidate AE items to the user. In one case, the interface 1000 can display a targeted set of candidate AE items, rather than a more inclusive list of AE items. Further, the interface 1000 can provide a more guided interface which invites the user to apply labels to the candidate AE items. For example, the interface 1000 can guide the user in entering a label for one or more individual candidate AE item in each analysis round. This guided interface can provide suitable explanatory messages pertaining to each candidate AE item.

The analysis system 102 can also modify its behavior for different users, e.g., by providing different focuses of interaction for different respective users. For example, assume that a user has expertise in a particular area (such as security scan technology), which enables the user to knowledgeably evaluate particular types of connections. The analysis system 102 can provide candidate AE items for evaluation which are pertinent to the user's area of expertise. In another example, assume that a user is a supervisor of a group of people within an organization. The analysis system 102 can provide candidate AE items for evaluation which pertain to the network activity of these subordinate employees. In another example, assume that a user is a member of a group of people who engage in the same types of activities, enabling the user to identify activities that are "normal" for the group. The analysis system 102 can provide candidate AE items for evaluation which pertain to the network activity of the group members. In one case, a user can invoke a customized interface by entering one or more filtering attributes which identify AE items of interest.

B. Collection System

Figure 11:
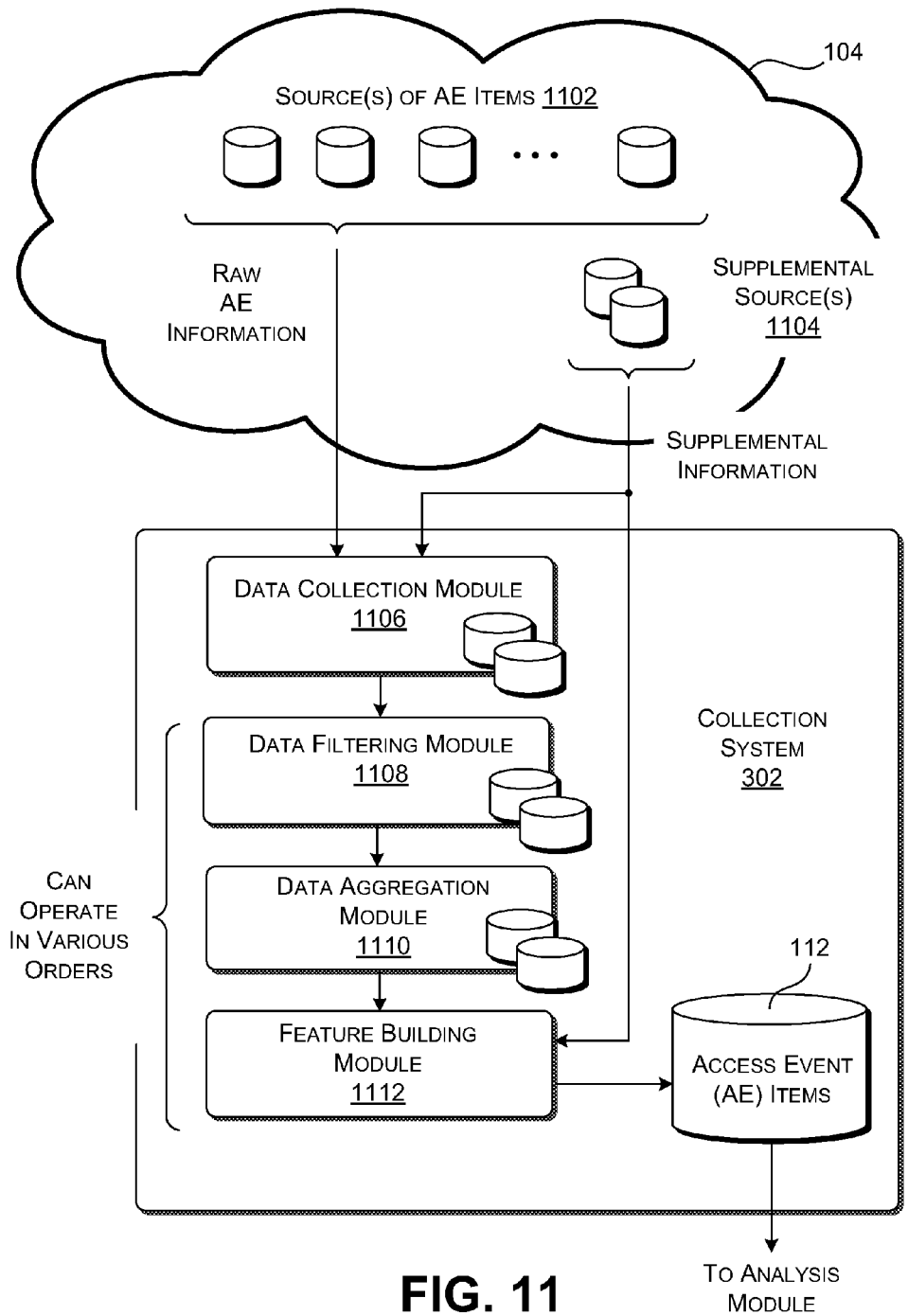
FIG. 11 shows one implementation of a collection system for use in the analysis system of FIG. 3.

FIG. 11 shows additional details of the collection system 302 which collects information from the computer network 104, from which it forms the AE items. The phrase AE information is used to describe any such information that is collected from the computer network 104.

More specifically, the collection system 302 can receive information from one or more sources 1102 (which can correspond to entities inside or outside of the computer network 104). These sources 1102 provide information which directly or indirectly indicates that connections have taken place within the computer network 104. The content of that information may differ from source to source. In the general case, this information may provide some information regarding the entities involved in a transaction, as well as the time at which the transaction took place.

Any type of entity within the computer network 104 may implement the sources 1102. For example, various entities within the computer network 104 may maintain logs or records that reflect connection-related activity over a span of time. The collection system 302 can mine any one or more of these sources for AE information that can be used to construct AE items. For example, in one case, a source of AE information may correspond to an entity within the computer network 104 that is entrusted with granting requests for connections in the computer network 104. For example, FIG. 12 (to be discussed below) describes a ticket granting service module that generates a record of "log on" requests. Alternatively, or in addition, a source of AE information may correspond to any entity that provides a service of any type to users. Such an entity may maintain a log of requests by users to access its service. Alternatively, or in addition, a source of AE information may correspond to a routing entity within the computer network 104. Such an entity may maintain a record of transactions within the computer network 104, that is, insofar as this entity plays a role in routing the transactions. Yet other entities may play a role in providing AE information for use in constructing AE items.

The collection system 302 can also receive supplemental information from one or more supplemental sources 1104 (which can correspond to entities inside or outside of the computer network 104). The supplemental sources 1104 provide supplemental information which can be used to interpret the raw AE information collected from the sources 1102. In one case, the supplemental information may help in identifying, to the extent possible, the source entity and destination entity involved in a connection (if this information is not already conveyed by the sources 1102 themselves). For example, a directory resource (such as Microsoft Corporation's Active Directory®, or the like) can provide this information. In other cases, it may not be possible to resolve the identity of the user who is performing a transaction, and/or to conclusively pinpoint an originating or target machine associated with a transaction; in these circumstances, the collection system 302 can attempt to identify entities in a transaction using IP addresses or the like, together with any type of account information that is available.

More generally, the supplemental sources 1104 provide information which is useful in constructing features of the AE items. The content of the information received from the sources 1104 for this purpose may differ from source to source. Further, the availability of this information may differ from environment to environment. In one example, a supplemental source may correspond to a directory which identifies the services provided by each entity in the computer network 104.

Now referring to the collection system 302 itself, this component can include a data collection module 1106 for collecting AE information from the various sources (1102, 1104). The data collection module 1106 can use any technique to gather such information, such as a pull technique (in which the data collection module 1106 proactively pulls the AE information from the sources, e.g., on a periodic basis, an event-driven basis, or any other basis). Alternatively, or in addition, the data collection module 1106 can gather the information using a push technique (in which the data collection module 1106 receives AE information that is independently pushed to it by the sources).

The data collection module 1106 can receive the AE information (and supplemental information) over a span of time, such a day, week, month, etc. The data collection module 1106 can partition this data collection task in any manner. For example, the data collection module 1106 can collect and store sub-collections of AE information for separate respective days; these sub-collections can later be aggregated into a master graph. Generally, it may be useful for the collection system 302 to monitor and analyze network activity for an extended time to provide a more robust indication of normal (and abnormal) behavior within the computer network 104. For example, a type of behavior may appear abnormal when viewed over a short interval of time; but when that same behavior is viewed over a longer time interval, a pattern may emerge which establishes the non-malicious nature of that activity.

The data collection module 1106 can store the AE information in the form of individual records associated with respective connection events, referred to herein as AE items. An individual AE item includes various fields of descriptive information, expressed by features.

A data filtering module 1108 can optionally perform processing on the AE items to make these items easier to process. For example, the data filtering module 1108 can remove connections that are known with a high degree of confidence to represent non-malicious activity. For example, the data filtering module 1108 can remove connections to a domain controller module.

A data aggregating module 1110 can assemble plural sub-collections of AE items into a master graph. The master graph provides a record of all the connection events that have taken place over a span of time, such as a week, a month, etc. However, the data aggregating module 1110 can omit certain time intervals when it constructs the master graph. For example, in certain environments, the data aggregating module 1110 can omit weekend days when it constructs the master graph.

The data aggregating module 1110 can optionally consolidate similar AE items. For example, a user may use her personal computer to access an Email server twenty times in the course of the day. The data aggregating module 1110 can optionally represent this connection event as a single record. That single record can indicate the entities involved in the transaction, together with the frequency of the transaction.

In one case, the data aggregating module 1110 can modify the relevance of AE items based on their respective ages (with respect to their respective capture times). In one approach, the data aggregating module 1100 can update the master graph on a periodic basis, such as every day. Every time it does so, it can modify the relevancy scores of AE items by a weighting parameter $\lambda$, where $0 \le \lambda \le 1$. The successive application of this weighting parameter has the effect of reducing the relevancy of the AE items.

A feature building module 1112 assembles features pertaining to the AE items and associates those features with the AE items. The features describe different respective attributes of the AE items. The next section will describes illustrative features that can be used to characterize the AE items.

At this point, the collection system 302 has produced processed AE items which it can store in the data store 112. The analysis system 102 can retrieve records from this data store 112 using a pull technique, a push technique, or combination thereof. As a final point, FIG. 11 has described a series of operations that transform raw AE information and supplemental information into processed AE items. Other implementations can perform the same operations in a different order. For example, another collection system can perform the filtering operation after it conducts the aggregating information, and so on.

Figure 12:
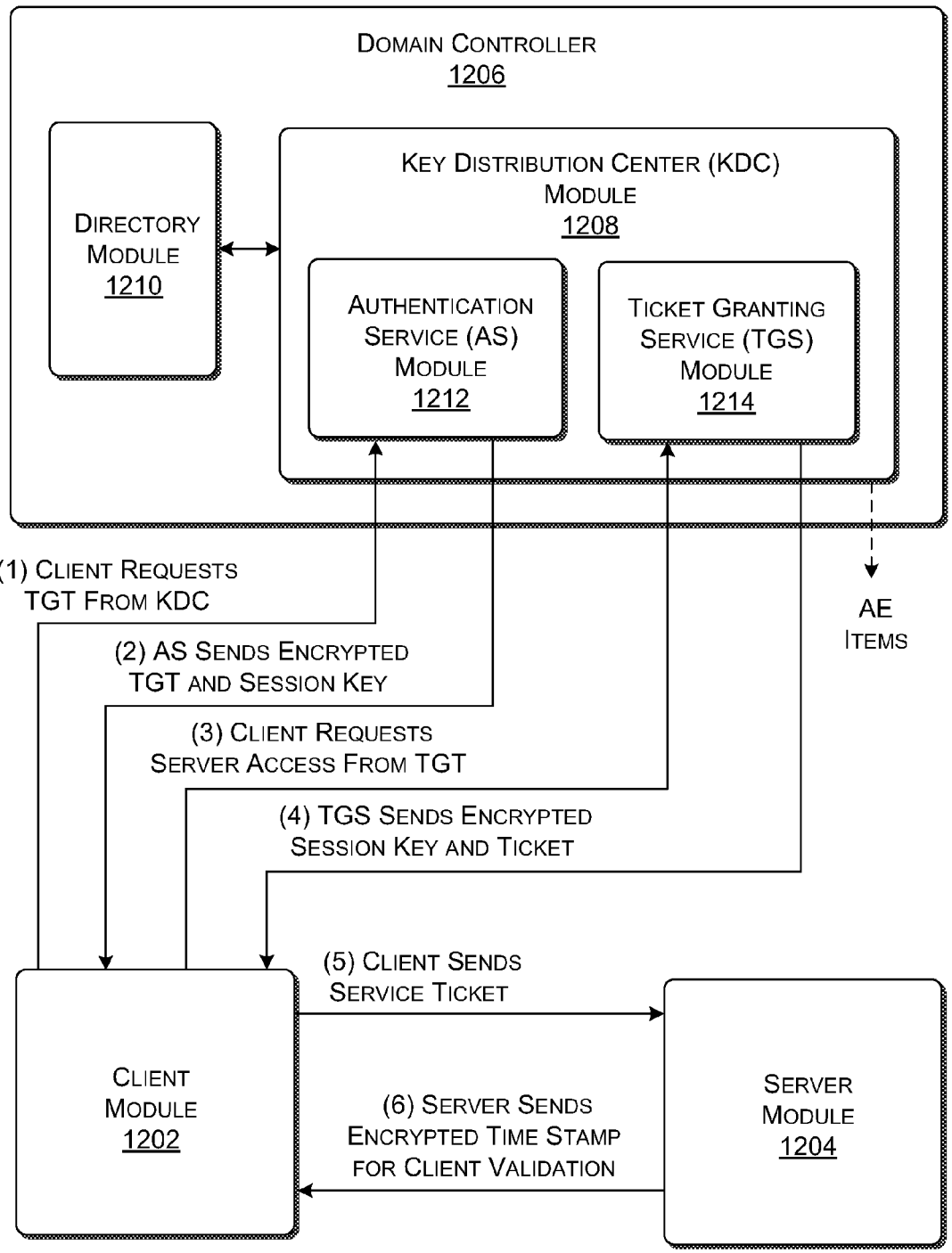
FIG. 12 shows a ticket granting service module, the operation of which generates access event items for input to the analysis system.

FIG. 12 shows one particular source of AE information. Namely, this source corresponds to a process whereby a client module 1202 (representing any source entity) asks for permission to access a server module 1204 (representing any destination entity). The client module 1202 can make such a request to access any type of service provided by the server module 1204. A domain controller 1206 provides a key distribution center (KDC) module 1208 for processing such a request, in conjunction with a directory module 1210 (such as Active Directory®). The KDC module 1208 itself includes an authentication service (AS) module 1212 and a ticket granting service (TGS) module 1214. The KDC module 1208 can maintain records that reflect granting tickets that it issues to requesting entities, such as the client module 1202. The collection system 302 can obtain these records and use the information contained therein as AE information.

In one procedure, the client module 1202 first requests a Ticket Granting Ticket (TGT) from the AS module 1212. If approved, the AS module 1212 sends an encrypted TGT and a session key to the client module 1202. The client module 1202 next requests the TGS module 1214 permission to access the server module 1204. If approved, the TGS module 1214 sends the encrypted session key and ticket to the client module 1202. Afterwards, the client module 1202 sends the service ticket to the server module 1204. Finally, the server module 1204 sends the encrypted time stamp for validation by the client module 1202.

FIG. 12 describes a case in which "log on" requests are used as a basis for constructing AE items. Alternatively, or in addition, actual "log on" events can be used as a basis for constructing AE items.

Figure 13:
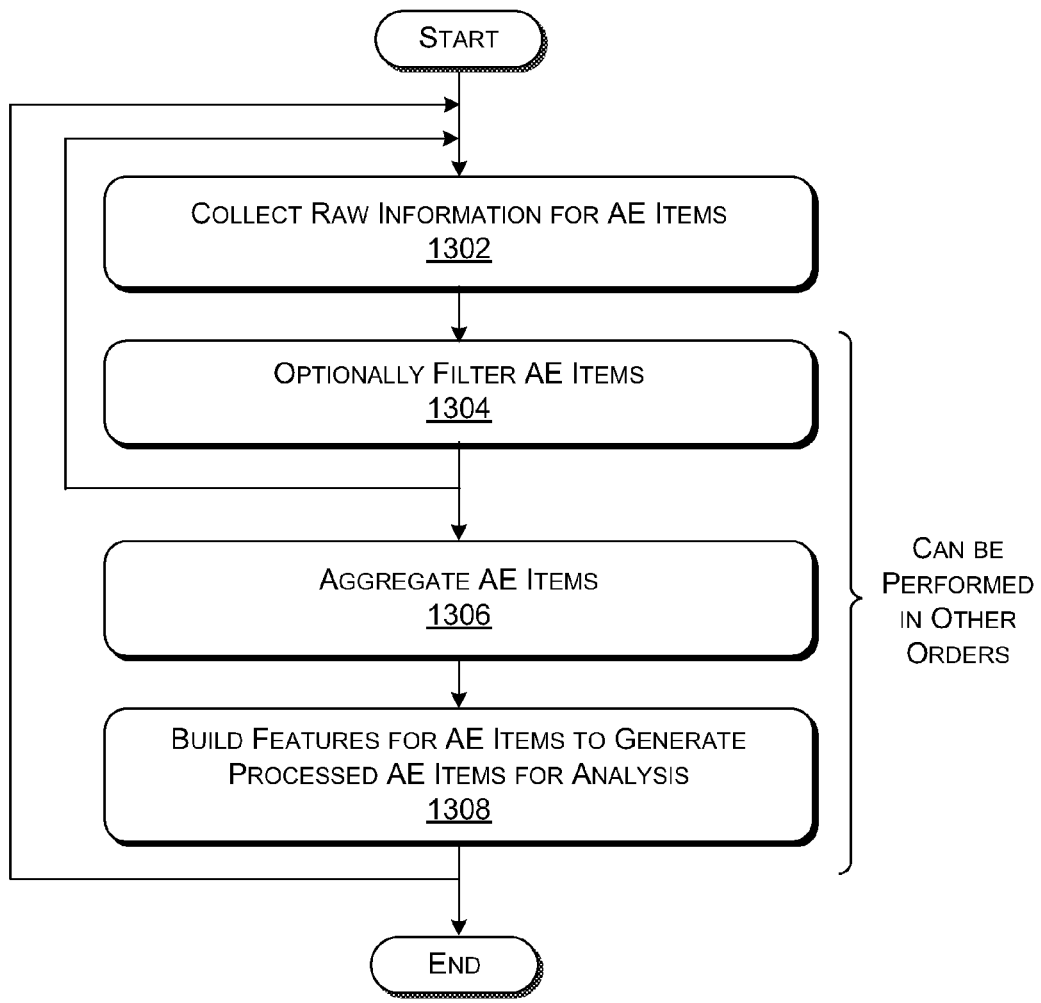
FIG. 13 is a flowchart that shows one manner of operation of the collection system of FIG. 11.

FIG. 13 shows a procedure 1300 which summarizes the explanation given above in flowchart form. In block 1302, the collection system 302 collects raw AE information from various sources 1102 of such information. As stated, these sources 1102 can correspond to various logs maintained by the computer network 104. The collection system 302 can also receive supplemental information that can be used to construct the features associated with the AE items. Block 1302 generally produces individual records that can be referred to as AE items. In block 1304, the collection system 302 optionally filters the AE items in any way to make this information more suitable for subsequent processing. FIG. 13 indicates that blocks 1302 and 1304 can be repeated on any basis, such as a periodic basis throughout a day, or on a daily basis, etc.

In block 1306, the collection system 302 aggregates separate sub-collections of AE items into a master record, that is referred to herein as a master graph. In block 1308, the collection system 302 may associate feature information with the AE items. FIG. 13 refers to this process as building the features of the AE items.

The outcome of the procedure 1300 is a master graph of processed AE items for subsequent processing by the analysis system 102. FIG. 13 shows an outer loop which indicates that the operations in FIG. 13 can be repeated on any basis, such as a periodic basis.

C. Activity Classification System

FIG. 14 shows one implementation of the activity classification module 308 of FIG. 3. To repeat, the purpose of the activity classification module 308 is to analyze the nature of the network activity represented by the AE items. The activity classification module 308 outputs candidate AE items which reflect the outcome of its analysis. The candidate AE items correspond to certain AE items that may be of use, once labeled, in clarifying the network activity represented by the AE items. The analysis system 102 invites the user to label the candidate AE items. Once that happens, the activity classification module 308 updates it modeling functionality and generates another set of candidate AE items for consideration by the user.

To remind the reader, the activity classification module 308 may perform its tasks using a feature-based analysis module 310 and a graph-based analysis module 312. Both modules (310, 312) contribute to the identification of candidate AE items. That is, the feature-based analysis module 310 performs analysis on the features of the AE items to classify the AE items into various classes. The feature-based analysis module 310 provides a feature-based approach to selecting candidate AE items. The graph-based analysis module 312 performs analysis on the graph structure associated with the AE items, and therefore adopts a more pattern-oriented approach to selecting candidate AE items. This section will first provide additional details regarding one implementation of the feature-based analysis module 310, followed by an explanation of graph-based analysis module 312.

The feature-based analysis module 310 includes two parts. A first part classifies unlabeled AE items into different classes based on labels provided by a user. A second part assesses the degree of anomaly of predicted labels provided by the first part.

As to the first part, a classifier training module 1402 can produce a multi-class classification model that maps input feature information into predicted labels. It performs this task by analyzing the features associated with AE items that have already been labeled by the user or some other authoritative source. The outcome of the training process is a set of parameters which characterize the multi-class classification model.

A trained multi-class classifier module 1404 uses the parameters provided by the classifier training module 1402 to analyze unlabeled AE items. That is, the multi-class classifier module 1404 can map feature information associated with the unlabeled AE items into predicted labels. (In another implementation, the multi-class classifier module 1404 can output predicted probabilities.) In one case, the multi-class classifier module 1404 can be implemented by any type of discriminative-based classifier, such as a classifier that uses a logistic regression technique or a support vector machine (SVM) technique. Alternatively, the multi-class classifier module 1404 can be constructed using a generative-based technique, such as a naïve Bayes classifier, and so on. Many other types of classifiers or boosted classifiers can also be used, such as a decision tree classifier or a boosted decision tree classifier, etc.

Any collection of features can be used to build the multi-class classifier module 1404. The features can be expressed as any combination of continuous variable information, discrete information items, binary (yes/no) information, and so on. Without limitation, the features can include the following features, or any subset thereof.

Source Name. This feature describes the name of the source user or computer. In one case, this feature can be represented as a truncated version of the full source name. For example, this feature can be represented by one or more trigrams selected from the full source name. A trigram is a consecutive sequence of three characters in the name. For example, assume that the full source name of a computer is "proxy1"; the source name feature can be represented by a first trigram "pro" (representing the first three characters of the name), a second trigram "rox," a third trigram "oxy," and a fourth trigram "xy1." This approach can often reliably identify computers that belong to a single functional class, such as proxies. Alternatively, or in addition, commonality among different (but related) textual strings can be established using any type of edit distance metric, or any other technique.

Source Domain. This feature describes the domain of the source user or computer.

Source Type. This feature describes whether the source node corresponds to a user or a computer.

Source Service. This feature describes, if the source node is a computer, a list of the services (e.g., printer service, database service, applications, etc.) supported by the source computer.

Source In-Degree. This feature describes the in-degree of the source node. For example, this feature describes the number of connections that point (lead) to a source computer.

Source Out-Degree. This feature describes the out-degree of the source node. For example, this feature describes the number connections that point out from a source computer.

Local Clustering Coefficient for Source Node. This feature provides a measurement of a connection density around the source node.

Destination Name. This feature identifies the name of the destination user or computer. This feature can be represented by a collection of trigrams of the full destination name, as described above.

Destination Domain. This feature identifies the domain of the destination user or computer.

Destination Type. This feature indicates whether the destination node is a user or a computer.

Destination Services. This feature provides, if the destination node is a computer, a list of the services supported by the destination computer.

Destination In-Degree. This feature describes the in-degree of the destination node. For example, this feature describes the number of connections that point (lead) to a destination computer.

Destination Out-Degree. This feature describes the out-degree of the destination node. For example, this feature describes the number of connections that point out from a destination computer.

Local Clustering Coefficient for Destination Node. This feature provides a measurement of a connection density around the destination node.

Edge Weight. This feature describes the number of connections that have occurred during some time period (such as a minute, hour, day, etc.).

Edge Centrality. This feature describes the number of all-pairs shortest paths that include an edge represented by the AE item.

The above list is not an exhaustive list of features. For example, the multi-class classifier module 1404 can also receive features from business logic of any type. For example, one or more other features can be based on information extracted from an organizational hierarchy. For example, assume that John and Sue belong to the same team within an organization. Assume that John routinely accesses "Server1" within the organization. If Sue begins to do the same, then the business logic may indicate that this connection may be non-malicious in nature. One or more features may express this conclusion.

In another case, one or more features can be based on information extracted from the physical location of entities. For example, assume that John and Sue have offices in the same floor of a particular building. Assume that Sue routinely uses "Server2" to perform some task. If John begins to do the same, the business logic may indicate that this connection may be non-malicious in nature. One or more features may express this conclusion.

As indicated in FIG. 14, the multi-class classifier module 1404 can provide an uncertainty score for each predicted label. The uncertainty score conveys a degree of confidence that the predicted label accurately describes the classification of the AE item. For example, as shown in FIG. 5, the AE items 506 and 508 may have a relatively high degree of uncertainty because they "lie" close to the hyperplane 502 in feature space. The multi-class classifier module 1404 can assess uncertainty based on the margin, and/or some other metric(s). Margin means the distance from the sample under consideration to the nearest hyperplane.

Advancing now to the second part of the feature-based analysis module 310, a model building module 1406 builds a model for each class identified by the user (and/or other authoritative source). These models can be characterized by a set of parameters. An anomaly assessment module 1408 uses these parameters to assess the log likelihood that an AE item is appropriately assigned to a particular label. In one case, the anomaly assessment module 408 can be constructed using a generative model, e.g., as implemented using NaïBayes, a Bayes Net, etc.

The anomaly assessment module 1408 can provide an anomaly score for each predicted label. The anomaly score indicates an extent to which an AE item diverges from other AE items that share the same label. For example, as shown in FIG. 5, the AE items 510 and 512 may have a relatively high anomaly score because they are "far away" from other AE items that have been assigned label "A" (in feature space).

As mentioned, the graph-based analysis module 312 performs analysis on the graph structure of the AE items, rather than a feature-space representation of the AE items. That is, the graph-based analysis module 312 provides candidate AE items by more directly using graph-based considerations. Additional detail regarding the operation of this module will be provided below. In one optional case, one or more conclusions reached by the graph-based analysis module 312 can feed back into the feature-based analysis module 310 as input features.

FIG. 14 indicates that other models and/or business logic 1410 can be incorporated into the activity classification module 308. These other types of modules (not shown) may provide other metrics that can be used to identify candidate AE items for consideration by the user.

Finally, the activity classification module 308 can include a ranking module 1412 which ranks the AE items based any one or more of the scores mentioned above. In one case, the ranking module 1412 can select one of the scores to rank the AE items. The user can optionally select the basis for which AE items are ranked, e.g., by clicking on a particular score-related heading in the interface 1000 shown in FIG. 10. In other cases, the ranking module 1412 can provide a master rank which takes into account two or more separate scores. The ranking module 1412 can then rank the AE items based on the master rank. Alternatively, or in addition, the feature-based analysis module 310 and/or the graph-based analysis module 312 can perform their own local ranking operations.

Figure 15:
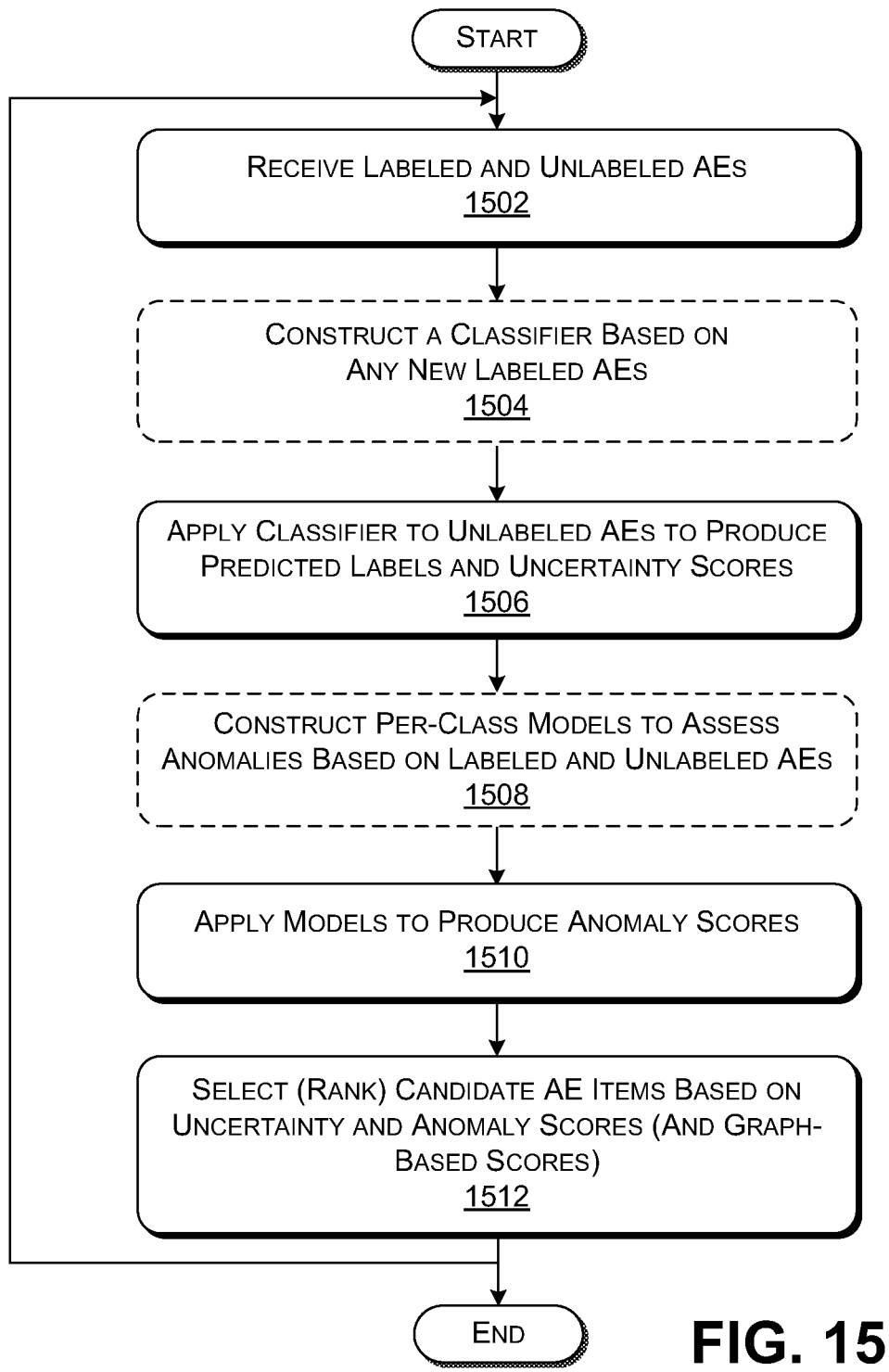
FIG. 15 is a flowchart that describes one manner of operation of the feature-based analysis module shown in FIG. 3.

FIG. 15 shows a procedure 1500 which summarizes the operation of the feature-based analysis module 310 in flowchart form. In block 1502, the feature-based analysis module 310 receives labeled and unlabeled AE items. In block 1504, the feature-based analysis module 310 constructs a multi-class classifier model based on the labeled AE items. More specifically, block 1504 is automatically or manually invoked when the user adds new labels to AE items, or changes existing labels of AE items. In block 1506, the feature-based analysis module 310 uses the trained multi-class classifier model to provide predicted labels for the unlabeled AE items. The feature-based analysis module 310 also generates uncertainty scores associated with its predicted labels.

In block 1508, the feature-based analysis module 310 constructs a generative model for each class identified by the user. More specifically, block 1504 is invoked when the user adds a new label or changes an existing label. In block 1510, the feature-based analysis module 310 uses the trained generative models to provide anomaly scores for the predicted labels assigned to the AE items.

In block 1512, the feature-based analysis module 310 selects the candidate AE items for consideration by the user. As described above, the feature-based analysis module 310 (or some other agent) can perform this function by ranking the AE items based on the uncertainty scores and/or the anomaly scores. The ranking defines an order in which the user is asked to review the AE items; hence, the ranking implicitly defines the candidate AE items.

The procedure of FIG. 15 can also be used to evaluate unlabeled edges without training or building models. Hence, FIG. 15 depicts blocks 1504 and 1508 with dashed borders (indicating that these operations may be omitted in some scenarios). For example, so long as the user does not add new labels or modify existing labels, the feature-based analysis module 310 need not update its modeling functionality. In this case, the analysis system 102 operates primarily in an evaluation mode, rather than a model-building mode.

Figures 16, 17:
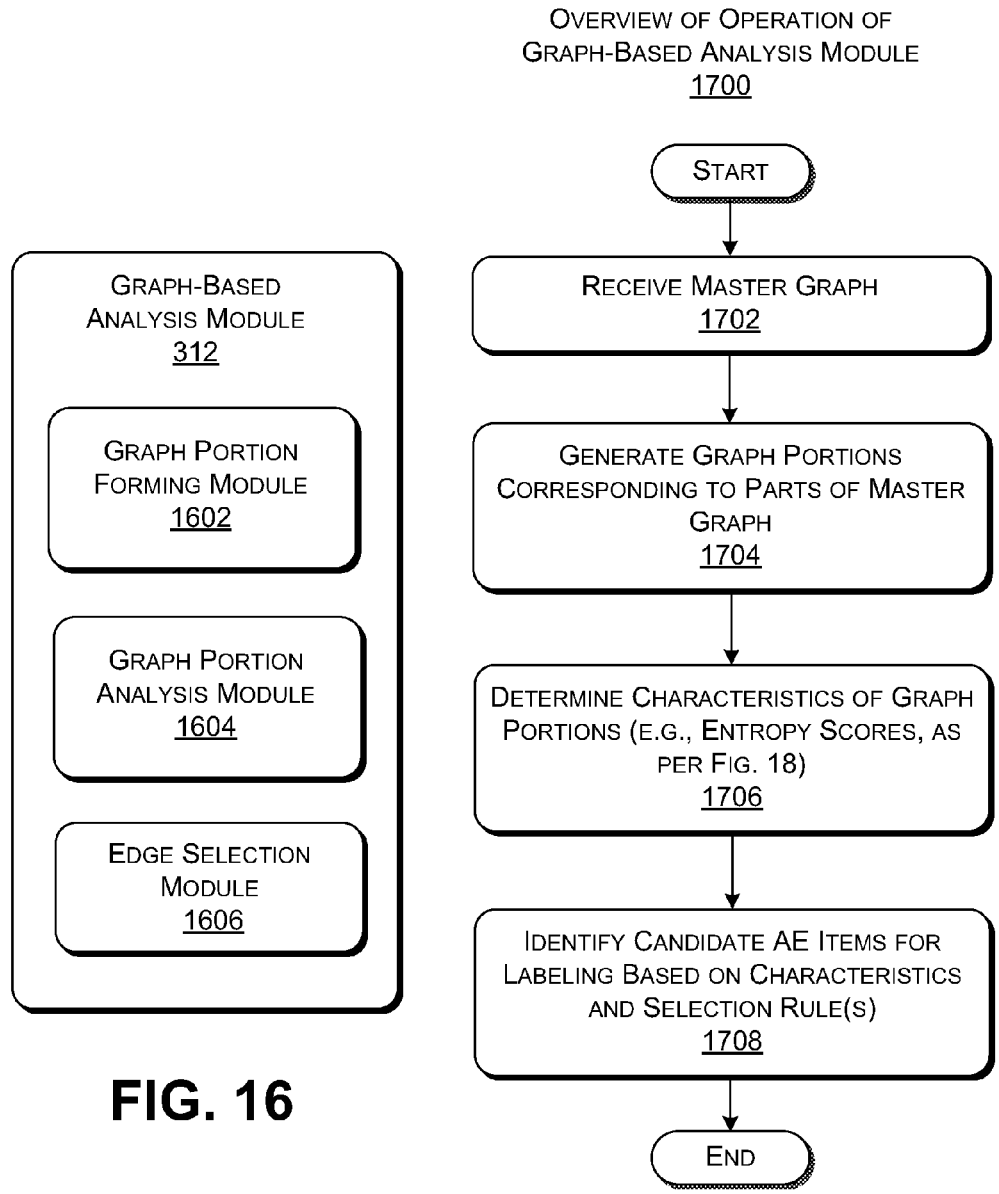
FIG. 16 shows one implementation of the graph-based analysis module of FIG. 3.
FIG. 17 is a flowchart that describes an overview of the operation of the graph-based analysis module shown in FIG. 3.
Figure 18:
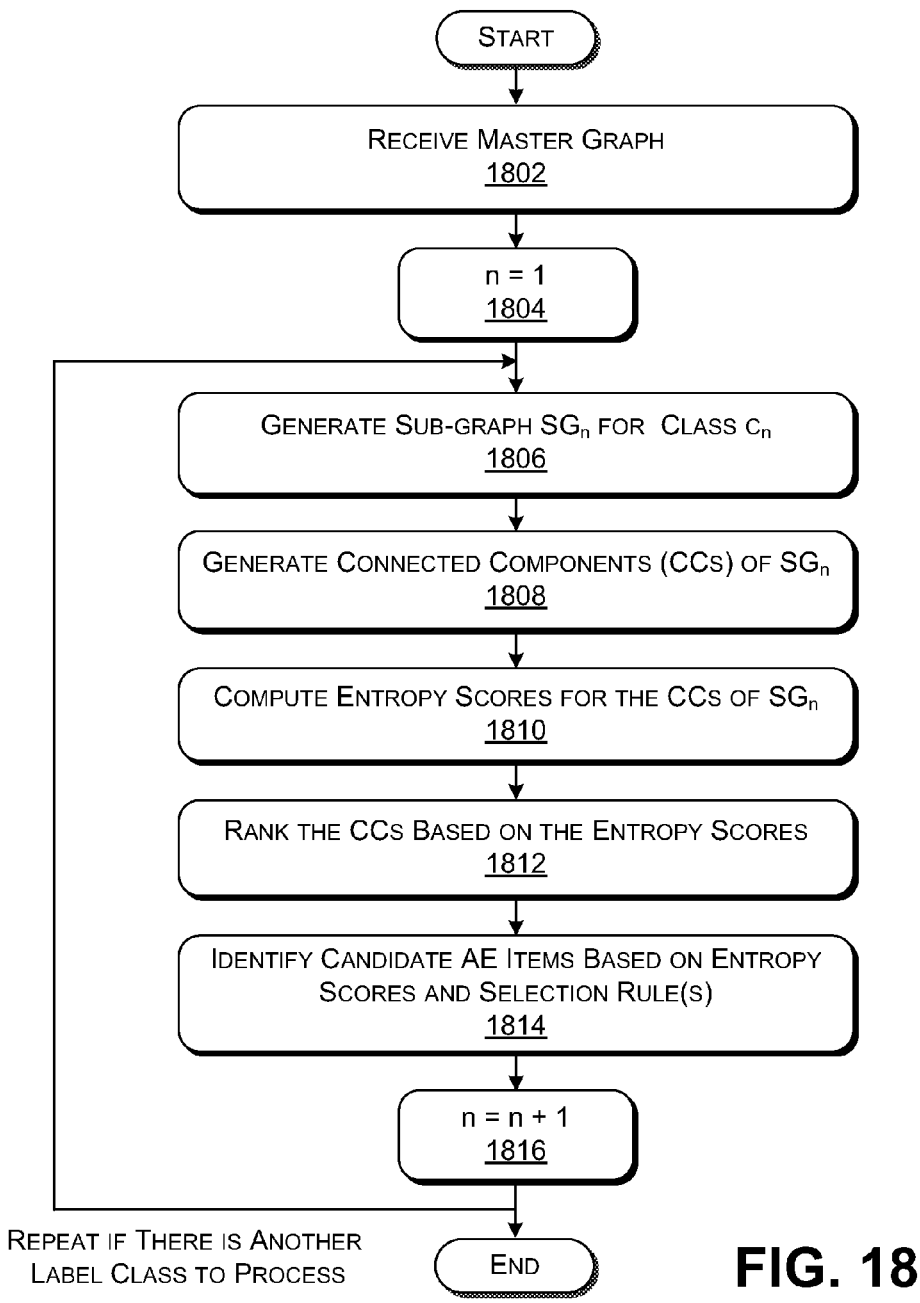
FIG. 18 is a flowchart that describes one manner of implementing the graph-based procedure shown in FIG. 17.

FIG. 16 describes illustrative functionality that can be used by the graph-based analysis module 312 to perform its operations. The components include a graph portion forming module 1602 that is configured to generate so-called graph portions. FIG. 7 shows a representative part of one such graph portion 700. The graph portion 700 represents a collection of AE items that form a connected graph, extracted from a master graph associated with a more encompassing collection of AE items. More specifically, each AE item in the graph portion 700 includes a source node and a destination node, connected by an edge. Thus, considered as a whole, the graph portion 700 describes a collection of nodes that are connected by a collection of edges. FIG. 18 (to be described below) will set forth illustrative criteria for selecting graph portions within the master graph.

A graph portion analysis module 1604 analyzes characteristics of each graph portion. For example, as will be described in the context of FIG. 18, the graph portion analysis module 1604 can compute the label entropy of each graph portion. The label entropy of a graph portion represents an amount of purity (e.g., uniformity) in the labels of the graph portion. A graph portion with a high purity (and low entropy) is relatively uniform (meaning that most edges have the same labels); a graph with a low purity (and high entropy) is relatively non-uniform.

An access event (AE) selection module 1606 uses the output of the graph portion analysis module 1604 to identify candidate edges for consideration by the user. As previously stated, the AE selection module 1606 chooses edges (and associated AE items) that may be instructive in clarifying the classification of AE items, based on one or more selection rules. These recommended AE items may complement the candidate AE items provided by the feature-based analysis module 310.

FIG. 17 shows a procedure 1700 which summarizes the explanation above in flowchart form. In block 1702, the graph-based analysis module 312 receives a master graph that represents a master collection of AE items. In block 1704, the graph-based analysis module 312 can generate graph portions. These graph portions correspond to respective parts of the master graph. FIG. 18 describes one basis for selecting such graph portions. In block 1706, the graph-based analysis module 312 analyzes characteristics of the graph portions. In block 1708, the graph-based analysis module 312 identifies one or more candidate AE items based on the characteristics identified in block 1708, together with one or more selection rules.

FIG. 18 shows a procedure 1800 that represents one implementation of the overview procedure 1700 described in FIG. 17. Other procedures can be used to perform the same functions described in FIG. 17.

In block 1802, the graph-based analysis module 312 receives the master graph. Assume that, at a current point in analysis, the master graph includes edges labeled using a set of N labels. Some edges are expressly labeled by users; other edges are assigned predicted labels by the feature-based analysis module 310 based on the user-labeled edges.

In block 1804, the graph-based analysis module 312 sets an iteration index (n) to 1; the iteration index identifies which one of the N classes is being processed at a current iteration of the loop shown in FIG. 18. In block 1806, the graph-based analysis module 312 generates a sub-graph SG for a first class to be processed, e.g., $SG_1$. This sub-graph represents a sub-collection of the AE items in the master graph that correspond to the first class.

More formally stated, consider a case in which the procedure 1800 of FIG. 18 is applied for a label c, where c is one of the N possible labels. First, the graph-based analysis module 312 gathers edges that have been labeled or have been predicted to be labeled as c in the sub-graph $SG_n$. The sub-graph $SG_n$ includes a set of edges E' and a set of nodes V'. The graph-based analysis module 312 then adds to $SG_n$ those edges in the master graph (regardless of class label) that have endpoints that appear in V'. For example, suppose that c correspond to class "A" identified in FIG. 7. In this case, block 1806 involves adding edge e2 shown in FIG. 7, because, although it is not a member of type "A," both of its endpoints are present in the connected component. In an alternative embodiment, AE items which only share a single node are included in the sub-graph.

In block 1808, the graph-based analysis module 312 generates one or more connected components (CC) for the sub-graph being processed. A connected component represents a sub-collection of connected AE items within the sub-graph. That is, a connected component represents one implementation of the graph portion 700 shown in FIG. 7.

In block 1810, the graph-based analysis module 312 computes the label entropy of each connected component identified in block 1808 (also referred to as just "entropy" below for brevity). In one case, the entropy of a connected component can be represented by:

$$Entropy(CC) = \sum_{l \in N_{CC}} -\frac{e_l}{e_T} \log\left(\frac{e_l}{e_T}\right).$$

In this expression, the Entropy(CC) represents the entropy of labels in a connected component. The term l represents one of the set of $N_{CC}$ labels included in the connected component CC. The term $e_l$ represents the number of edges (and associated AE items) that are classified as label l. The term $e_T$ represents the total number of edges (and associated AE items) that are present in the connected component. For example, the connected component shown in FIG. 7 has two types of edges, a first type of edge corresponding to label "A" and a second type of edge corresponding to label "B." Hence, $N_{CC}=\{A,B\}$ for this connected component and the Entropy (CC) metric includes the summation of two entropy components. A first entropy component is based on the ratio 6/7 (because six out of the seven edges are type "A") and the second entropy component is based on the ratio 1/7 (because 1 out of the seven edges are type "B").

In block 1812, the graph-based analysis module 312 ranks the connected components based on their respective entropy scores (i.e., Entropy(CC) metrics). For example, the graph-based analysis module 312 can rank the connected components from lowest entropy to highest entropy or vice versa.

In block 1814, the graph-based analysis module 1814 can use the entropy scores, together with one or more selection rules, to pick suitable candidate AEs from the connected components (corresponding to appropriate edges within the connected components). For example, the graph-based analysis module 312 can select the most anomalous edges within the connected components having the lowest entropy scores. For example, assume that the graph-based analysis module 312 generates the connected component shown in FIG. 7 (in the course of processing an "A" sub-graph). This connected component has a low entropy score because only one of the edges is not labeled as "A." Accordingly, the graph-based analysis module 312 can pick the outlier edge (e2) within this connected component for consideration by the user. As mentioned above, based on another selection rule, the graph-based analysis module 312 can also select one of the "A" edges to confirm whether it is appropriate to label most of edges in FIG. 7 as type "A."

In block 1816, the graph-based analysis module 312 increments the index n. It then repeats the above-described operations with respect to the next label in the set of N labels.

The graph-based analysis module 312 can use other metrics to characterize the graph structure associated with AE items (besides, or in addition to, the entropy score). For example, the graph-based analysis module 312 can identify the number of connected components produced in block 1808. A small number of connected components may indicate that the classification (performed by the feature-based analysis module 310) has not yet matured and that more feedback is appropriate to discover more meaningful class categories.

The graph-based analysis module 312 (and/or the ranking module 1412) can use different rules to rank the edges identified in the manner described above. Suppose that a connected component contains plural impure edges, instead of just one impure edge as shown in FIG. 7. In this case, the graph-based analysis module 312 can randomly rank the impure edges. Alternatively, the graph-based analysis module 312 can rank the edges based on their respective class probabilities (e.g., $e_i/e_T$). The graph-based analysis module 312 and/or the ranking module 412 can also rank all of the edges (collected from all of the connected components) by their respective anomaly scores and/or uncertainty scores.

Further, recall from the discussion of FIG. 8 that the analysis system 102 can interleave feature-based analysis with graph-based analysis in any manner. For example, in one round of labeling, the analysis system 102 can ask the user to label the most uncertain AE item for each of the previously identified classes. In the next round of labeling, the analysis system 102 can ask the user to label the most anomalous AE item for each class. Next, the analysis system 102 can ask the user to label the most anomalous edge in the most pure connected component for each class which has been previously identified. This sequence can be varied in any way. Further, within a single round of labeling, the analysis system 102 can ask the user to label some items that have been identified based on feature-based analysis and other items that have been identified based on graph-based analysis. Further, the analysis system 102 can identify items for labeling based on a combination of feature-based analysis and graph-based analysis.

D. Representative Processing Functionality

FIG. 19 sets forth illustrative electrical data processing functionality 1900 that can be used to implement any aspect of the functions described above. With reference to FIG. 3, for instance, the type of processing functionality 1900 shown in FIG. 19 can be used to implement any aspect of the analysis system 102, collection system 302, and/or response system 304. The type of processing functionality 1900 shown in FIG. 19 can also be used to implement any component within the computer network 104. In one case, the processing functionality 1900 may correspond to any type of computing device that includes one or more processing devices.

The processing functionality 1900 can include volatile and non-volatile memory, such as RAM 1902 and ROM 1904, as well as one or more processing devices 1906. The processing functionality 1900 also optionally includes various media devices 1908, such as a hard disk module, an optical disk module, and so forth. The processing functionality 1900 can perform various operations identified above when the processing device(s) 1906 executes instructions that are maintained by memory (e.g., RAM 1902, ROM 1904, or elsewhere). More generally, instructions and other information can be stored on any computer readable medium 1910, including, but not limited to, static memory storage devices, magnetic storage devices, optical storage devices, and so on. The term computer readable medium also encompasses plural storage devices.

The processing functionality 1900 also includes an input/output module 1912 for receiving various inputs from a user (via input modules 1914), and for providing various outputs to the user (via output modules). One particular output mechanism may include a presentation module 1916 and an associated graphical user interface (GUI) 1918. The processing functionality 1900 can also include one or more network interfaces 1920 for exchanging data with other devices via one or more communication conduits 1922. One or more communication buses 1924 communicatively couple the above-described components together.

In closing, the description may have described various concepts in the context of illustrative challenges or problems. This manner of explication does not constitute an admission that others have appreciated and/or articulated the challenges or problems in the manner specified herein.

Further, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for analyzing network activity, comprising:

receiving a plurality of labeled access event items and unlabeled access event items from a computer network, each access event item pertaining to a connection made in the computer network between a first entity and a second entity;

constructing a multi-class classifier model based on the labeled access event items;
predicting labels for the unlabeled access event items using the multi-class classifier model;
generating scores for each access event item to identify potential anomalies using feature-based analysis and graph-based analysis;
ranking the access event items using the generated scores;
presenting a list of candidate problematic access event items to a user in ranked order based on the generated scores;
receiving one or more labels from the user to assign to the presented access event items;
removing the access event items with user assigned labels from consideration as problematic access event items;
updating the ranked list of candidate problematic access event items;
presenting the user with the updated list of candidate problematic access event items; and
successively removing accepted access event items identified by the user from consideration to reveal at least one potentially unacceptable access event item, if the at least one potentially unacceptable access event item is present.

2. The computer-implemented method of claim 1, wherein the first entity is one of a user or a machine, and wherein the second entity is one of a user or a machine.

3. The computer-implemented method of claim 1, wherein the computer network is implemented by network infrastructure provided by an organization.

4. The computer-implemented method of claim 1, wherein the computer network is implemented by network infrastructure provided, at least in part, by a wide area network.

5. The computer-implemented method of claim 1, wherein the plurality of labeled access event items and unlabeled access event items is a collection of access event items formed by aggregating plural sub-collections of access event items, the sub-collections of access event items being collected over plural respective time intervals.

6. The computer-implemented method of claim 1, wherein each label received from the user identifies a type of access event item associated with the candidate problematic access event item.

7. The computer-implemented method of claim 6, wherein each candidate problematic access event item presented to the user has a classification that is assessed as uncertain.

8. The computer-implemented method of claim 6, wherein each candidate problematic access event item presented to the user has a classification that is assessed as anomalous.

9. The computer-implemented method of claim 6, wherein using graph-based analysis to identify potential anomalies comprises:
generating a plurality of graph portions of the master graph, the master graph being formed based on the access event items;
determining characteristics of the graph portions; and
identifying, based on the characteristics of the graph portions and at least one selection rule, one or more candidate problematic access event items, each corresponding to an edge in the graph portions.

10. The computer-implemented method of claim 6, wherein using graph-based analysis to identify potential anomalies comprises:
generating a sub-graph of the master graph, the sub-graph being associated with a particular type of access event item, the master graph being formed based on a collection of the plurality of access event items;
generating at least one connected component within the sub-graph, each connected component corresponding to a sub-collection of connected access event items;
computing an entropy score for each connected component; and
identifying, based on the entropy score of each connected component and at least one selection rule, one or more candidate problematic access event items, each corresponding to an edge in said at least one connected component.

11. The computer-implemented method of claim 6, wherein using feature-based analysis and graph-based analysis comprises using feature-based analysis and graph-based analysis in succession to identify said at least one candidate problematic access event item.

12. The computer-implemented method of claim 6, wherein using feature-based analysis and graph-based analysis comprises using an integrated combination of the feature-based analysis and the graph-based analysis to identify said at least one candidate problematic access event item.

13. A system for analyzing a collection of access event items collected from a computer network, each access event item pertaining to a connection made in the computer network between a first entity and a second entity, comprising:
a general-purpose computing device;
a computer program comprising an analysis module that is executable by the general-purpose computing device, the analysis module comprising:
an analyst interaction module configured to provide an interface that allows a user to interact with the analysis module; and
an activity classification module that uses active learning including both feature-based analysis and graph-based analysis to identify a plurality of candidate problematic access event items, generate a ranked list of the candidate problematic access event items for presentation to the user via the analyst interaction module, receive from the user one or more labels to assign to the presented access event items, remove the access event items with user assigned labels from consideration as problematic access event items, update the list of candidate problematic access event items, present the user with an updated list of candidate problematic access event items, and successively remove accepted access event items identified by the user from consideration to reveal at least one potentially unacceptable access event item, if the at least one potentially unacceptable access event item is present.

14. The system of claim 13, wherein the activity classification module comprises a feature-based analysis module configured to generate at least one uncertainty score for each access event item, the uncertainty score identifying an extent to which a classification of the access event item is assessed as uncertain.

15. The system of claim 13, wherein the activity classification module comprises a feature-based analysis module configured to generate at least one anomaly score for each access event item, the anomaly score identifying an extent to which a classification of the access event item is assessed as anomalous.

16. The system of claim 13, wherein the activity classification module comprises a graph-based analysis module configured to generate an entropy score, the entropy score identifying, for each graph portion of a master graph associated with the access events items, a degree of label purity in the graph portion.

17. A storage device for storing computer readable instructions, the computer readable instructions when executed by one or more processing devices perform a method for analyzing network activity comprising:
- receiving a plurality of labeled access event items and unlabeled access event items from a computer network, each access event item pertaining to a connection made in the computer network between a first entity and a second entity;
- constructing a multi-class classifier model based on the labeled access event items;
- predicting labels for the unlabeled access event items using the multi-class classifier model;
- generating scores for each access event item to identify potential anomalies using feature-based analysis and graph-based analysis;
- ranking the access event items using the generated scores;
- presenting a list of candidate problematic access event items to a user in ranked order based on the generated scores;
- receiving one or more labels from the user to assign to the presented access event items;
- removing the access event items with user assigned labels from consideration as problematic access event items;
- updating the ranked list of candidate problematic access event items;
- presenting the user with the updated list of candidate problematic access event items; and
- successively removing accepted access event items identified by the user from consideration to reveal at least one potentially unacceptable access event item, if the at least one potentially unacceptable access event item is present.

18. The storage device of claim 17, wherein each candidate problematic access event item presented to the user has a classification that is assessed as uncertain.

19. The storage device of claim 17, wherein each candidate problematic access event item presented to the user has a classification that is assessed as anomalous.

20. The storage device of claim 19, wherein using feature-based analysis and graph-based analysis comprises using feature-based analysis and graph-based analysis in succession to identify candidate problematic access event items.

* * * * *